US011431475B2

(12) United States Patent
Ertl et al.

(10) Patent No.: US 11,431,475 B2
(45) Date of Patent: Aug. 30, 2022

(54) METHOD AND SYSTEM FOR LOG DATA ANALYTICS BASED ON SUPERMINHASH SIGNATURES

(71) Applicant: Dynatrace LLC, Waltham, MA (US)

(72) Inventors: Otmar Ertl, Linz (AT); Edyta Kalka, Gdansk (PL)

(73) Assignee: Dynatrace LLC, Waltham, MA (US)

( * ) Notice: Subject to any disclaimer, the term of this patent is extended or adjusted under 35 U.S.C. 154(b) by 701 days.

(21) Appl. No.: 16/440,439

(22) Filed: Jun. 13, 2019

(65) Prior Publication Data
US 2019/0386819 A1 Dec. 19, 2019

Related U.S. Application Data

(60) Provisional application No. 62/685,380, filed on Jun. 15, 2018.

(51) Int. Cl.
*H04L 29/06* (2006.01)
*H04L 9/06* (2006.01)
(Continued)

(52) U.S. Cl.
CPC ............ *H04L 9/0643* (2013.01); *G06F 7/582* (2013.01); *G06F 7/588* (2013.01);
(Continued)

(58) Field of Classification Search
CPC ............... G06F 7/582; G06F 11/3068; G06F 11/3082; H04L 9/3247
(Continued)

(56) References Cited

U.S. PATENT DOCUMENTS

2017/0201503 A1* 7/2017 Jayasena ................. G06F 21/85
2018/0203916 A1* 7/2018 Rafsky .................. G06F 16/285
2018/0357422 A1* 12/2018 Telang .................. G06F 21/577

OTHER PUBLICATIONS

O. Ertl—BagMinHash—Minwise hashing algorithm for weighted sets. In proceedings of the ACM SIGKDD 24th International Conference on Knowledge Discovery and Data Mining (KDD), pp. 1368-1377, 2018.
(Continued)

*Primary Examiner* — Evans Desrosiers
(74) *Attorney, Agent, or Firm* — Harness, Dickey & Pierce, P.L.C.

(57) ABSTRACT

A system and method for the analysis of log data is presented. The system uses SuperMinHash based locality sensitive hash signatures to describe the similarity between log lines. Signatures are created for incoming log lines and stored in signature indexes. Later similarity queries use those indexes to improve the query performance. The SuperMinHash algorithm uses a two staged approach to determine signature values, one stage uses a first random number to calculate the index of the signature value that is to update. The two staged approach improves the accuracy of the produced similarity estimation data for small sized signatures. The two staged approach may further be used to produce random numbers that are related, e.g. each created random number may be larger than its predecessors. This relation is used to optimize the algorithm by determining and terminating when further created random numbers have no influence on the created signature.

22 Claims, 13 Drawing Sheets

Create Similarity Index for Problem Graphs using SuperMinHash Signatures

(51) Int. Cl.
    *G06F 7/58*         (2006.01)
    *H04L 9/08*         (2006.01)
    *H04L 9/32*         (2006.01)
    *G06F 11/30*       (2006.01)

(52) U.S. Cl.
    CPC ...... *G06F 11/3068* (2013.01); *G06F 11/3082* (2013.01); *H04L 9/0869* (2013.01); *H04L 9/3247* (2013.01)

(58) Field of Classification Search
    USPC ........................................................ 708/250
    See application file for complete search history.

(56) References Cited

OTHER PUBLICATIONS

Animesh Nandi, et al., Anomaly Detection Using Program Control Flow Graph Mining From Execution Logs, KDD '16, Aug. 13-17, 2016, San Francisco, CA, pp. 215-224, ACM Press, New York, NY, USA.

Tristan Cacqueray, Anomaly Detection in CI Logs, RDO, Nov. 14, 2017, pp. 1-11.

Jack W. Stokes, et al., MART: Targeted Attack Detection on a Compromised Network, MILCOM 2016—2016 IEEE Military Communications Conference, Nov. 1, 2016, pp. 988-997.

Otmar Ertl, SuperMinHash—A New Minwise Hashing Algorithm for Jaccard Similarity Estimation, arXiv:1706.05698v1, Jun. 18, 2017, Cornell University Library, Ithaca, NY, USA.

\* cited by examiner

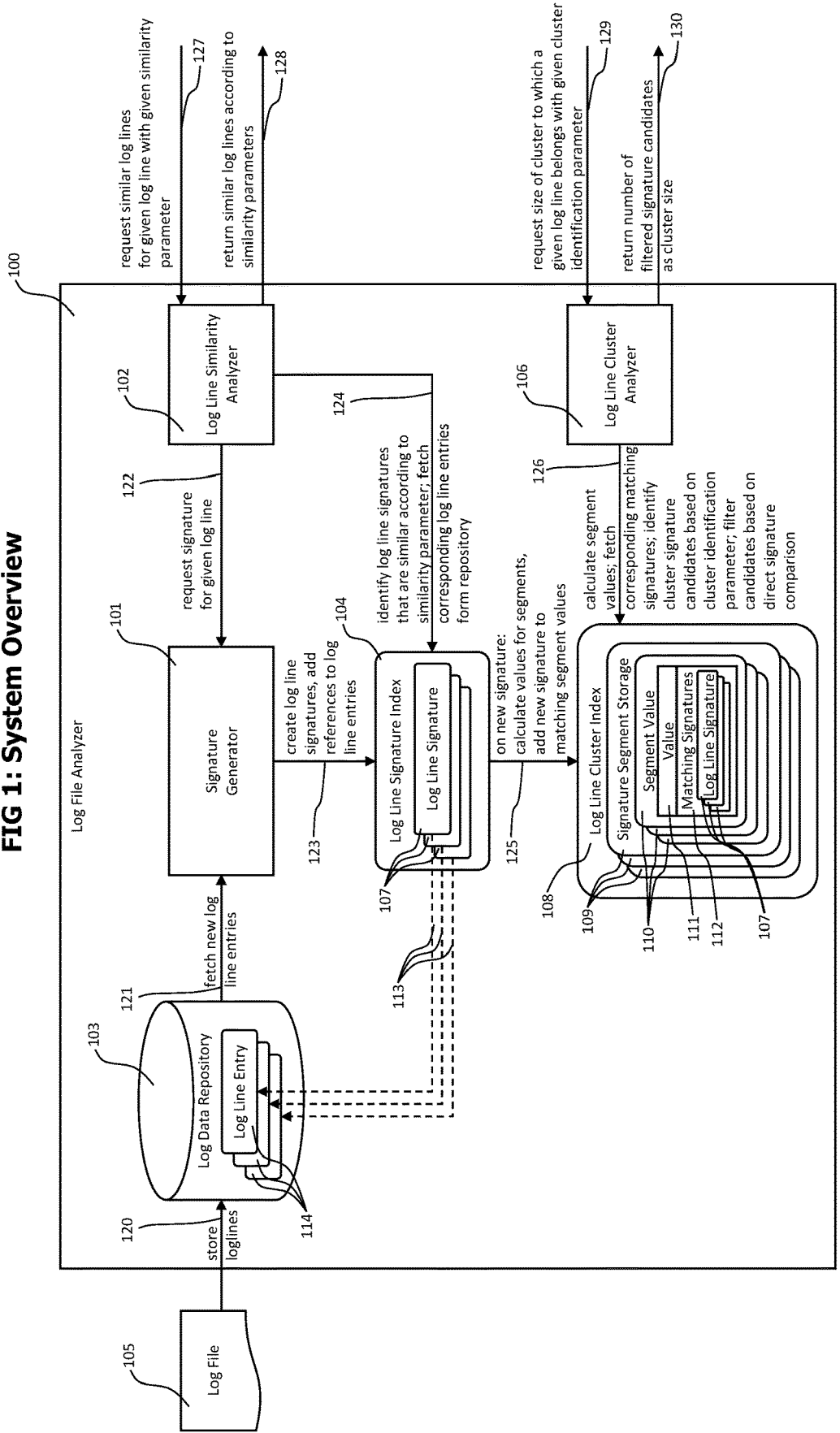
FIG 1: System Overview

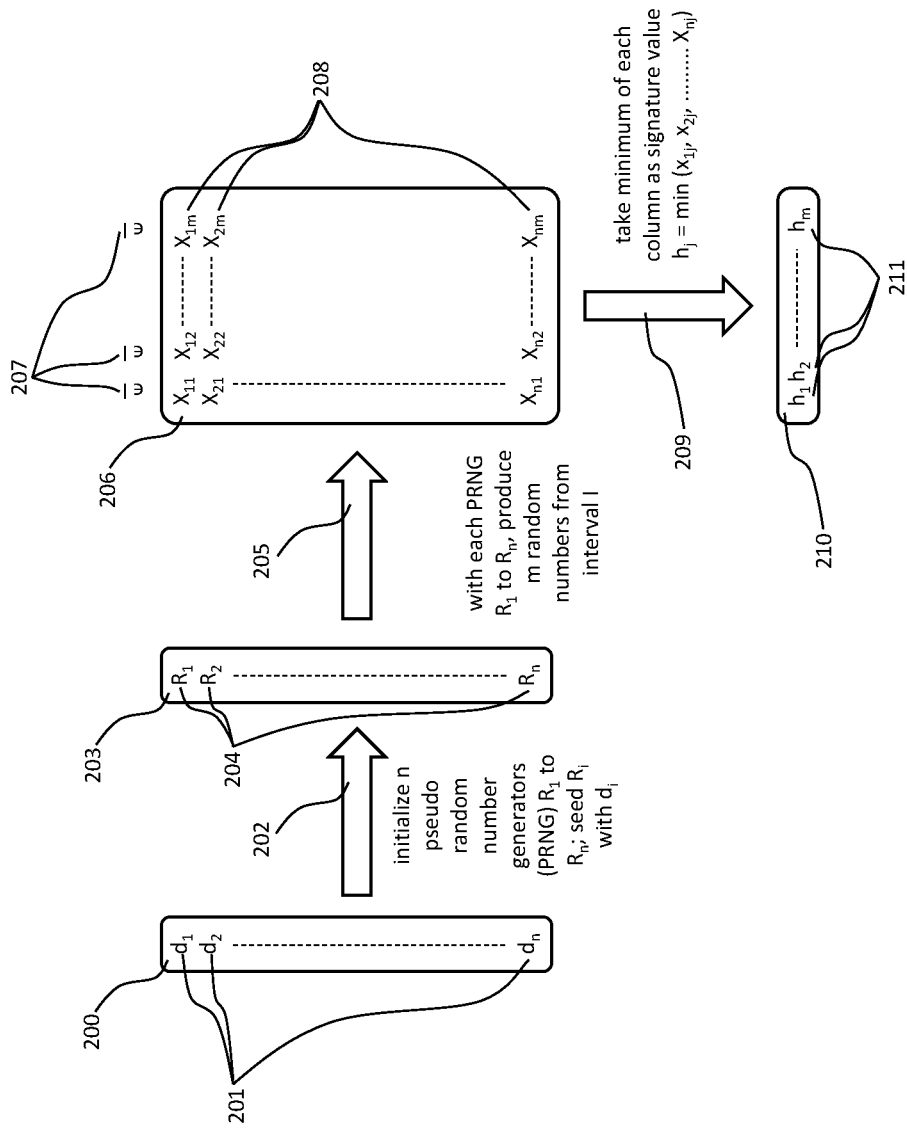
FIG 2: Visualization of MinHash Calculation (Prior Art)

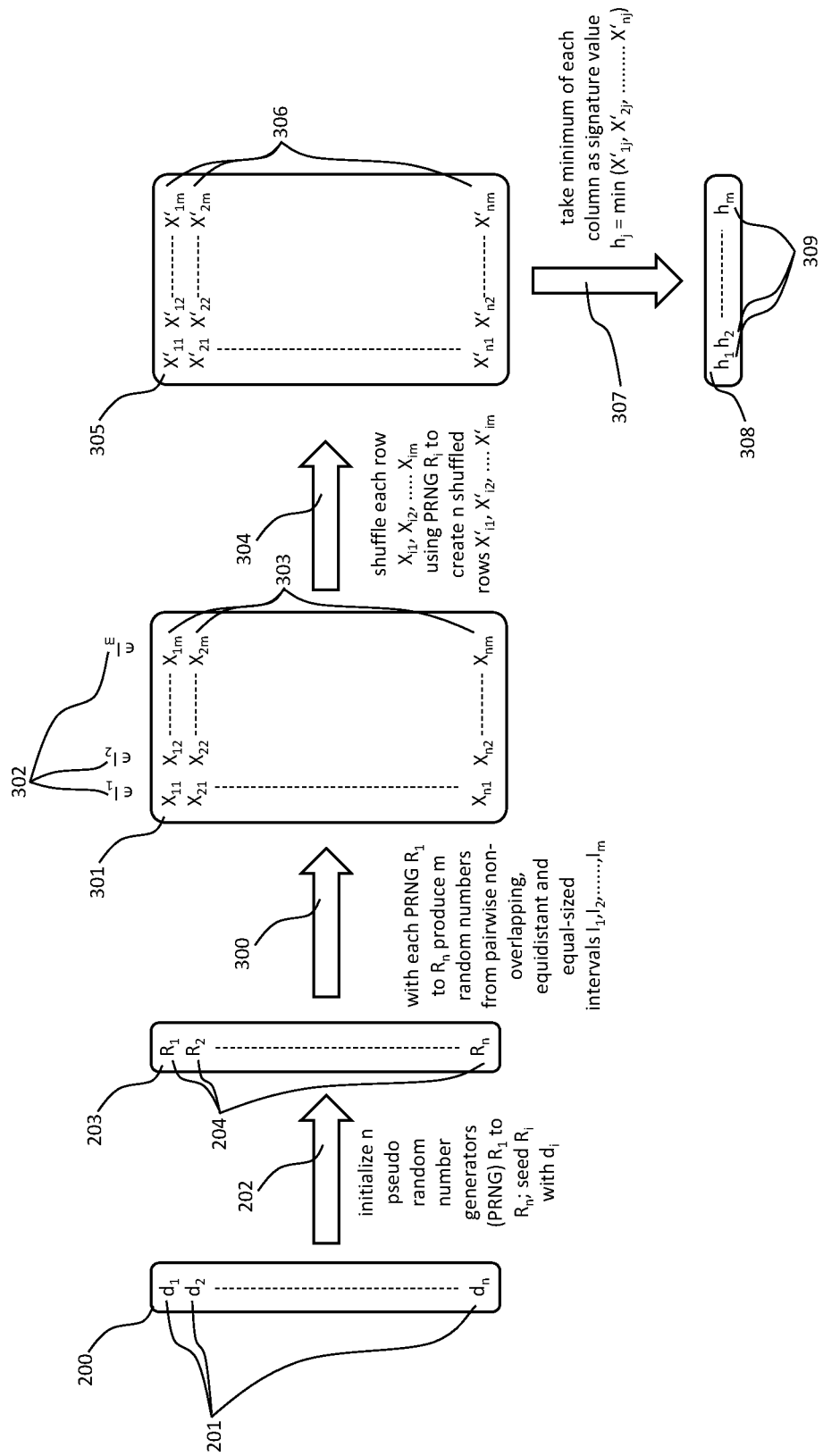

FIGs 4A-4B: Conceptual Hash Based Pseudo Random Number Generator
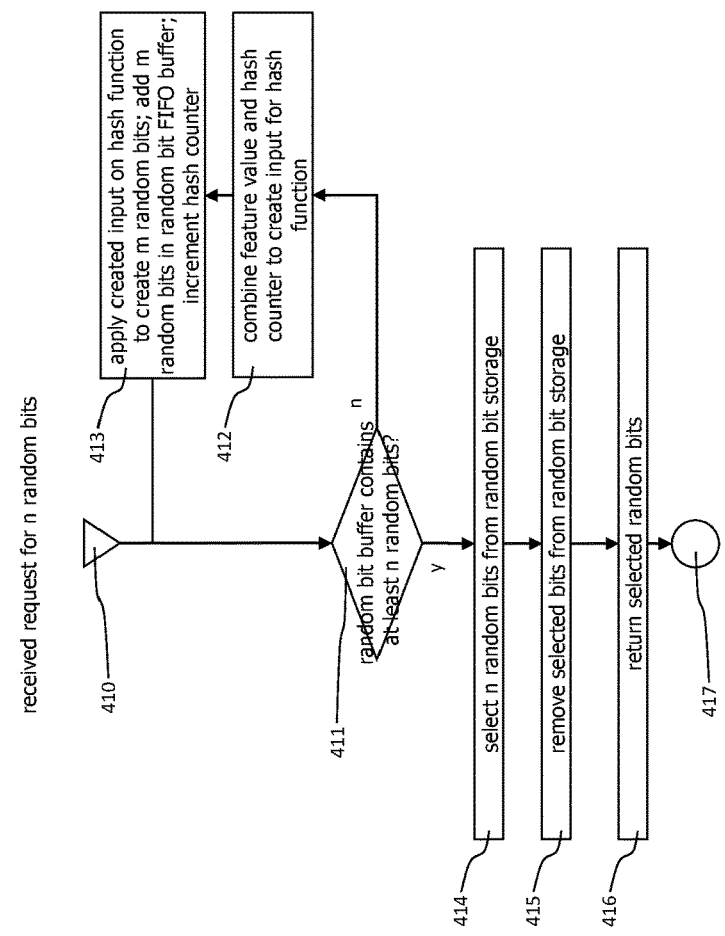
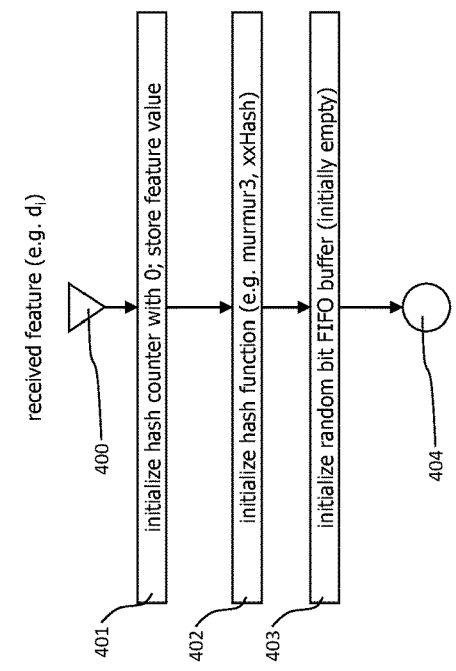

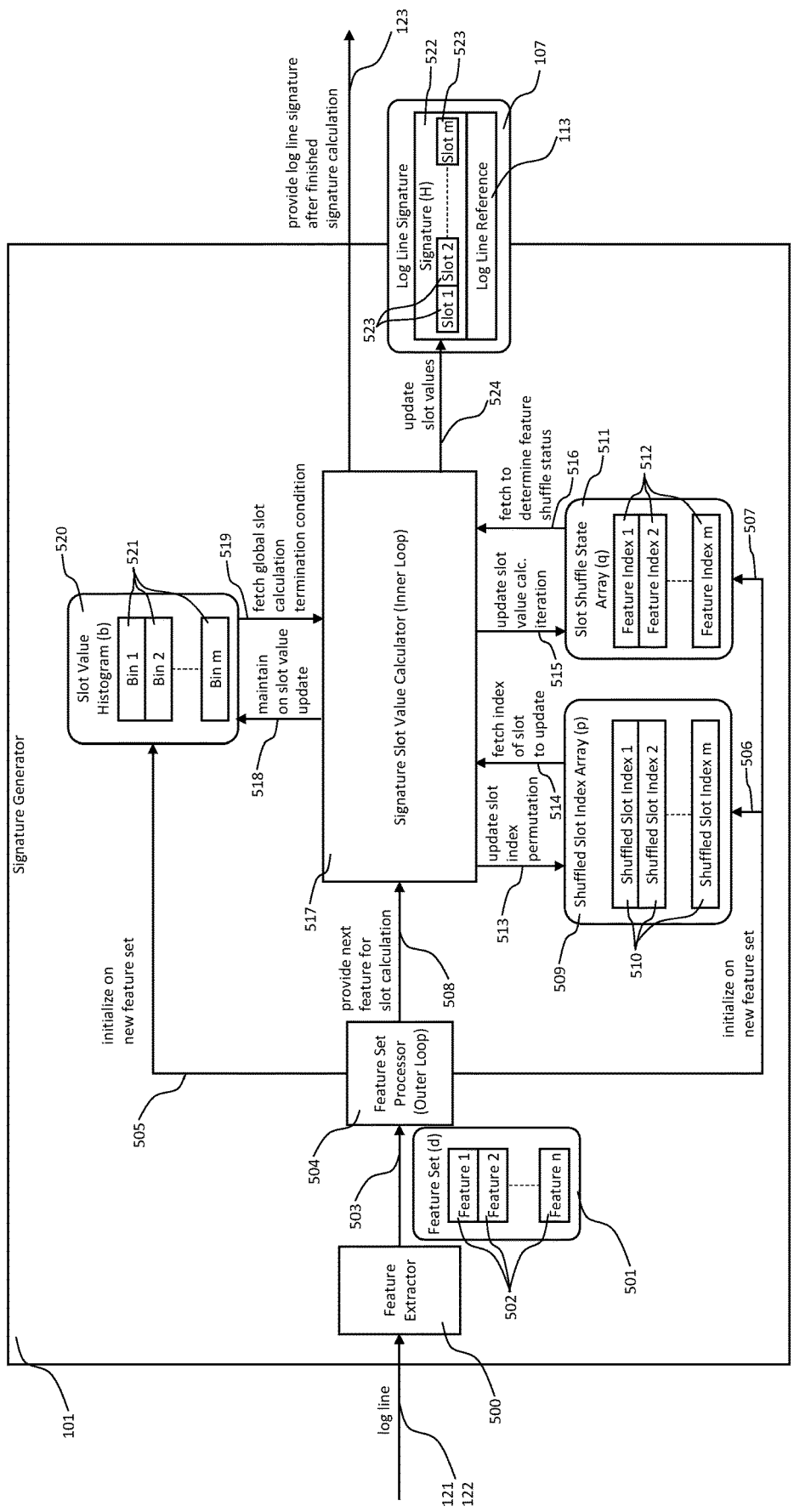
FIG 5: Signature Generator

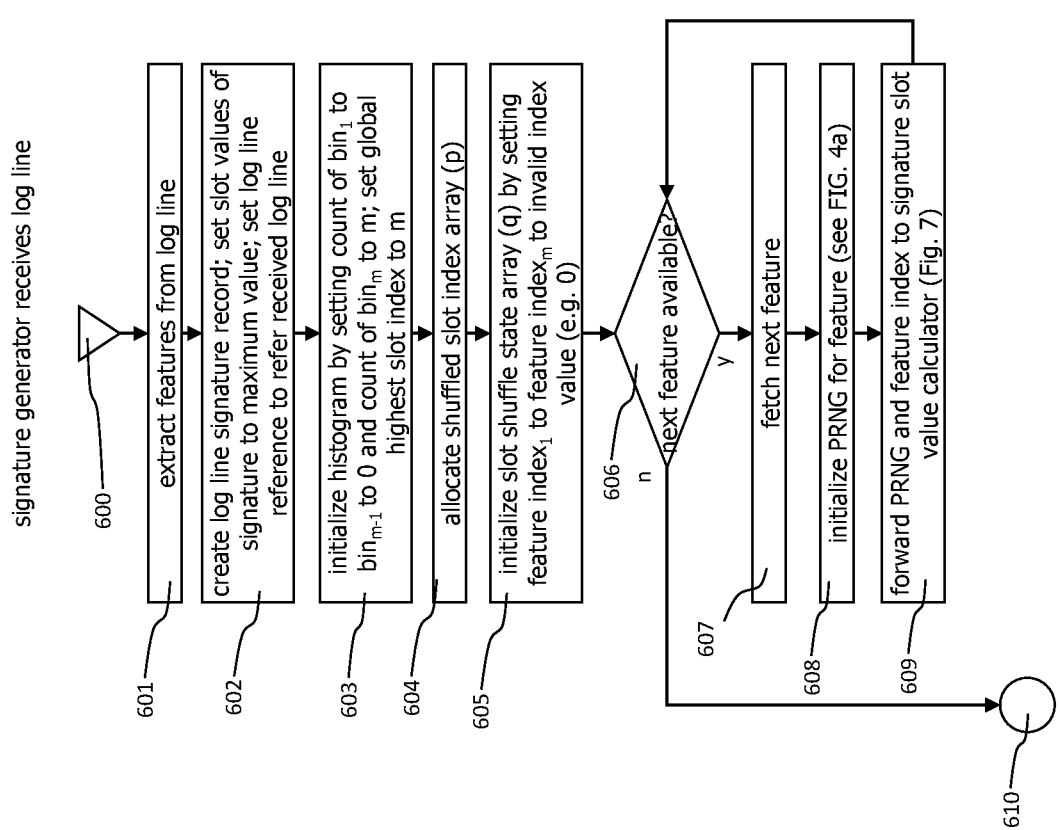
FIG 6: Processing of Received Log Line

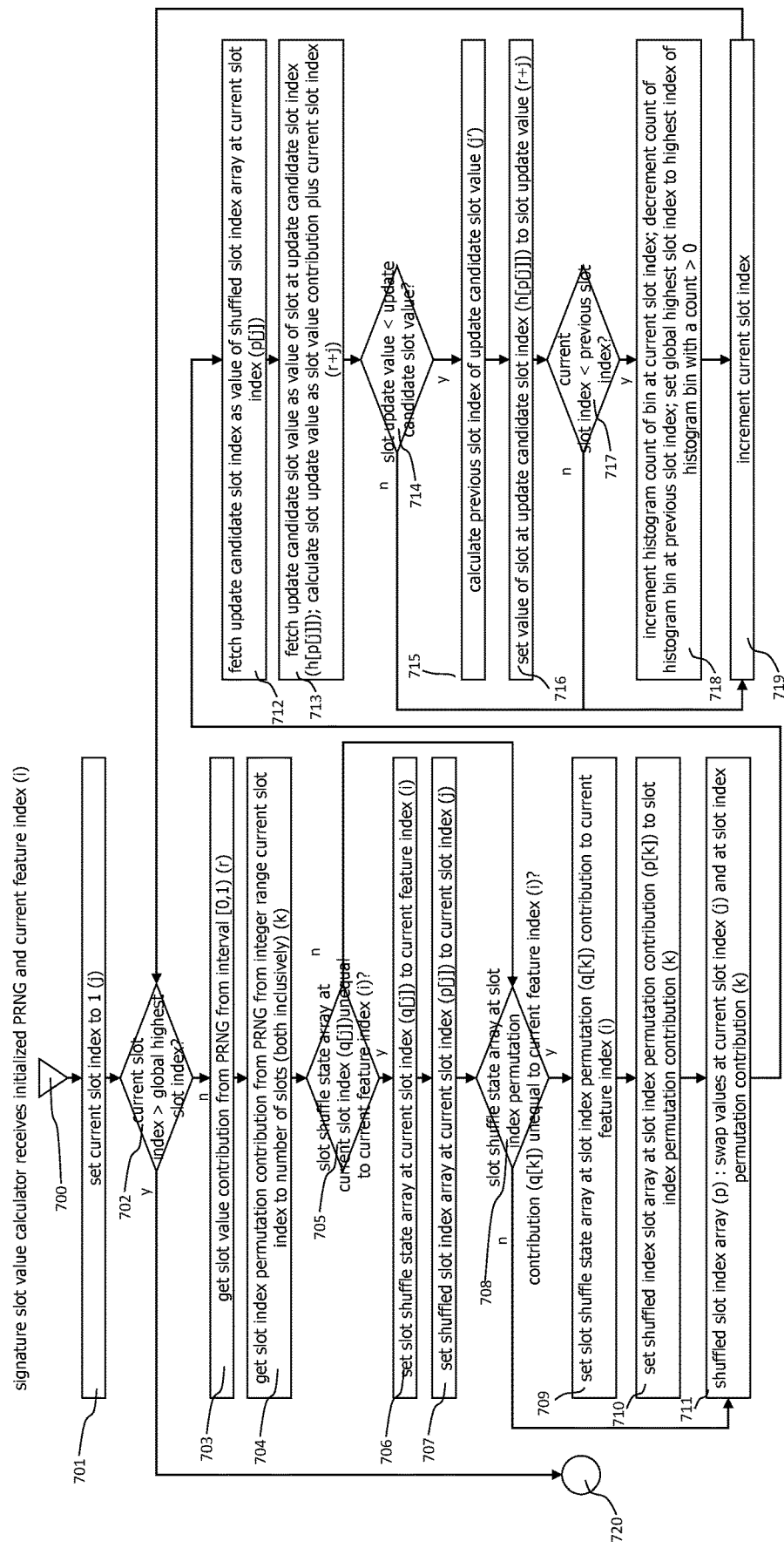

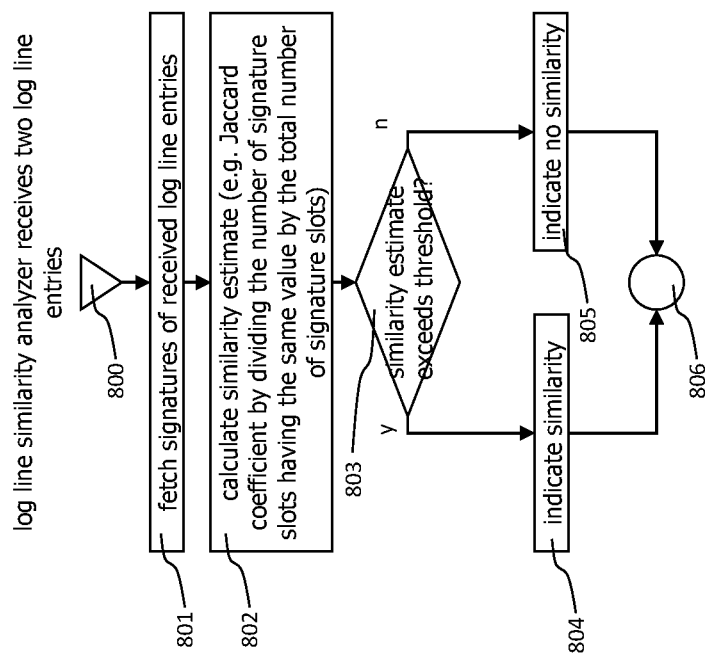

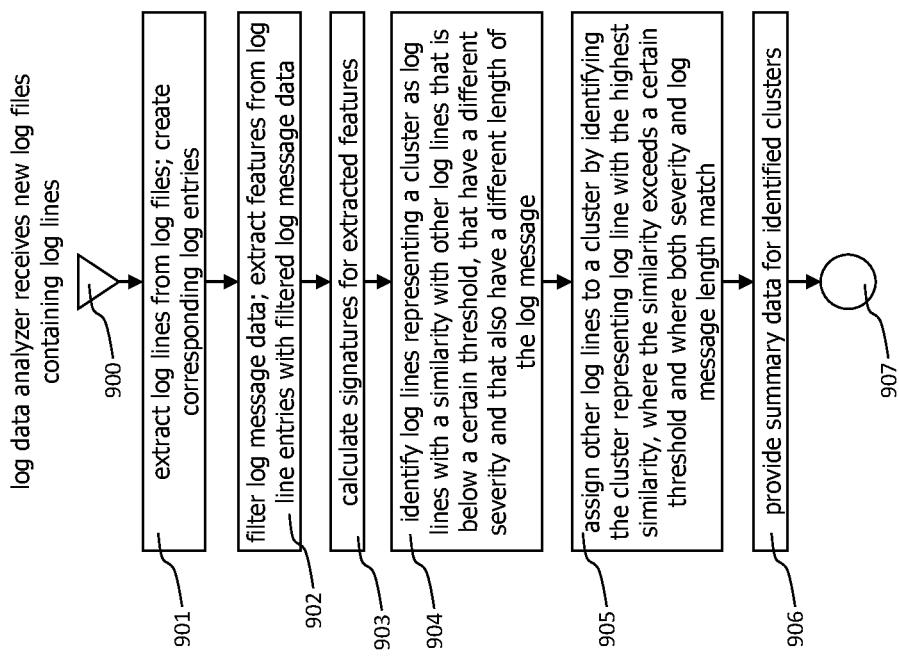
FIG 9: Signature Based Cluster Calculation

FIG 10: Create Similarity Index for Problem Graphs using SuperMinHash Signatures problem graph describing set containing causally dependent events describing abnormal operating conditions received

1000

1001 — map graph topology information to feature data: create tuple for each directly connected event pair, where the cause event may be the first element of the tuple and the effect event the second 1002 — enrich topology tuples with discretized data describing the probability of a causal relationship 1003 — for each event, extract feature data describing but not identifying the event; add extracted feature data to tuple list 1004 — use created tuple as input for the SuperMinHash algorithm to create a signature hash for the problem; use problem signature to create problem similarity index 1005 — store problem in problem archive; add reference to stored problem to corresponding problem similarity index entry

1006

FIGA 11A-11C: Application of Problem Similarity Index
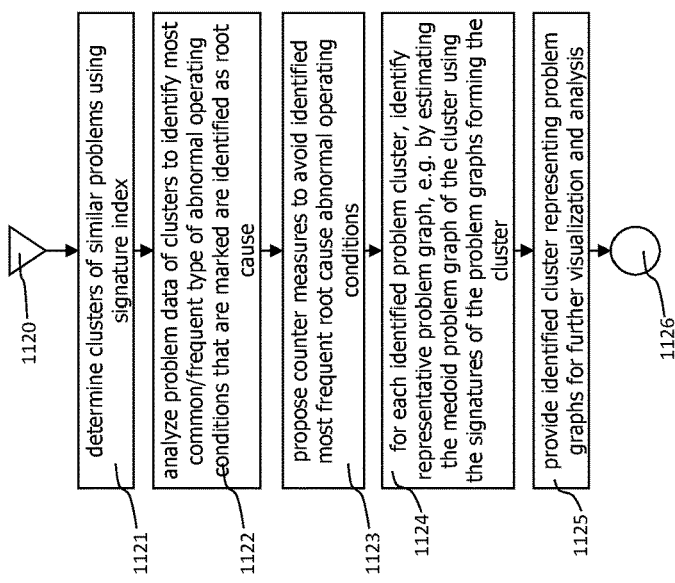
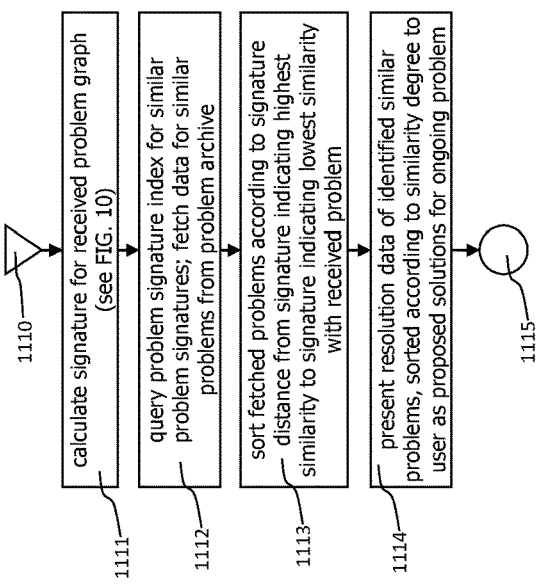
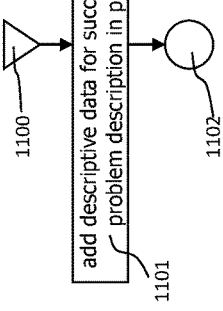

FIGS 12A-12B: Creation and Usage of Similarity Index for Transaction Traces using SuperMinHash Signatures
FIG 12a: Update Transaction Similarity Index on new Transaction Trace
FIG 12b: Fetch Similar Transaction Traces for given Transaction Trace
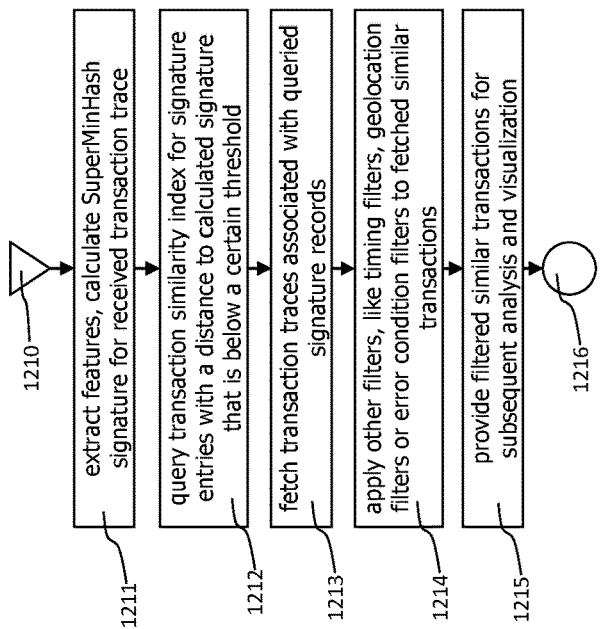
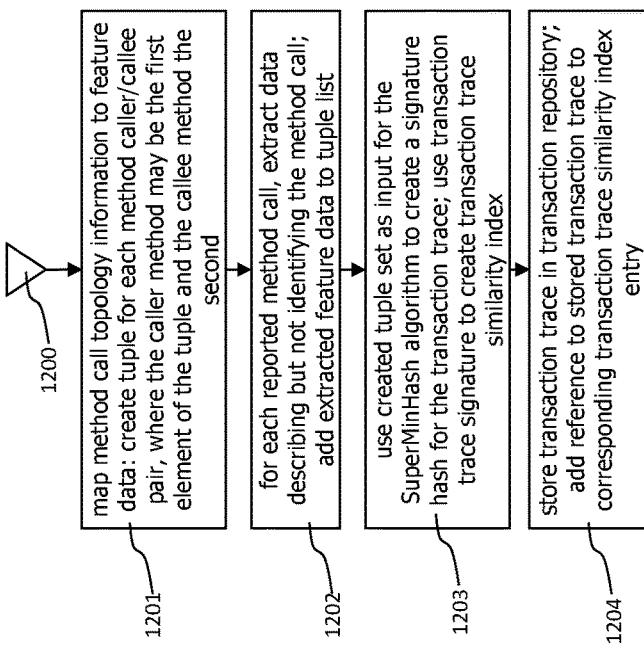

FIGS 13A-13C: Creation and Usage of Similarity Index for Visits using SuperMinHash Signatures
FIG 13a: Update Visit Similarity Index on new Visit
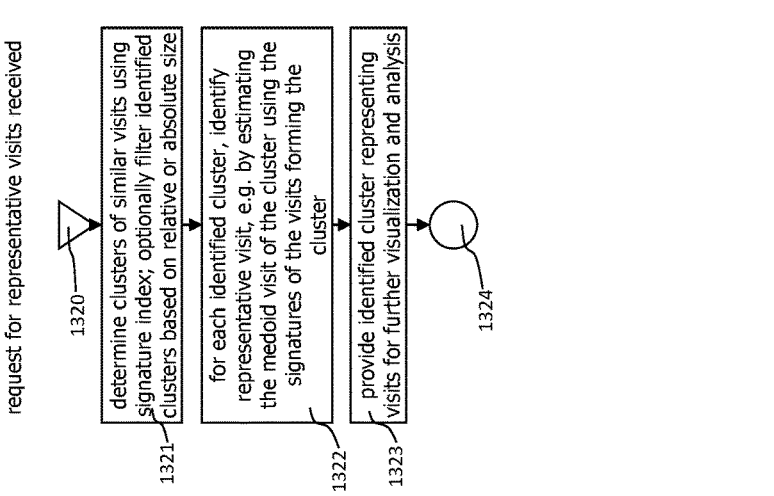
FIG 13b: Fetch Similar Visits for given Visit
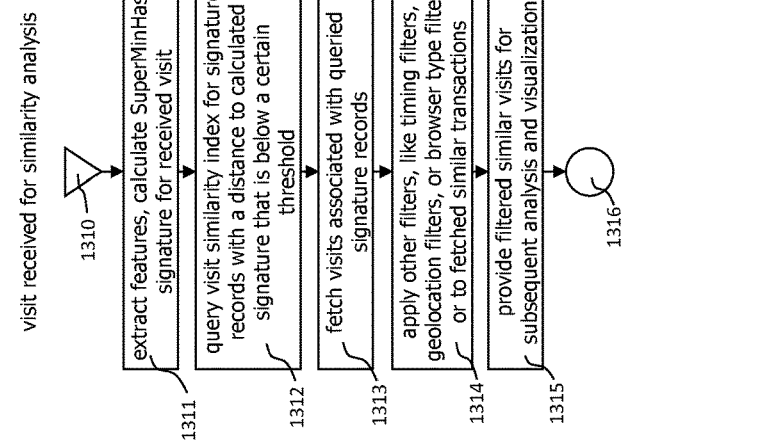
FIG 13c: Exemplary Visit Cluster Analysis
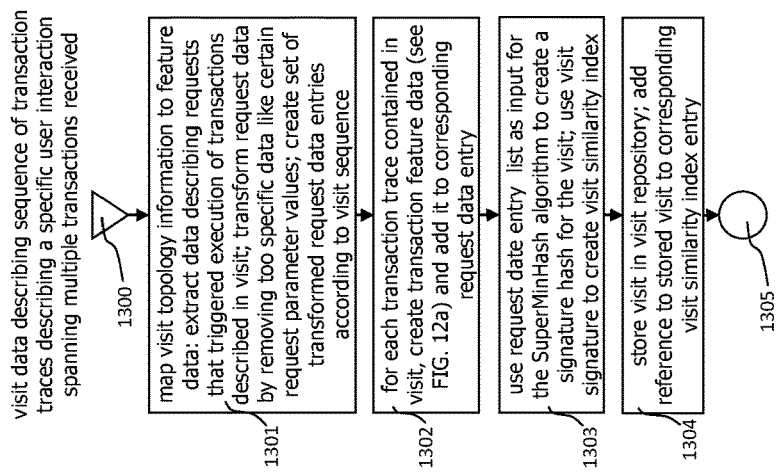

METHOD AND SYSTEM FOR LOG DATA ANALYTICS BASED ON SUPERMINHASH SIGNATURES

CROSS-REFERENCE TO RELATED APPLICATIONS

This application claims the benefit of U.S. Provisional Application No. 62/685,380, filed on Jun. 15, 2018. The entire disclosure of the above application is incorporated herein by reference.

FIELD

The present disclosure generally relates to the analysis of log data using locality sensitive hash-signatures and more specifically relates to the analysis of log data using Super-MinHash signatures.

BACKGROUND

Log data produced by applications during their execution is a vital input for the analysis of the operating conditions of those applications to e.g. determine abnormal execution conditions of an application that may cause failure of transactions initiated by users of the application.

Modern applications are typically built by a network of communicating services, each service instance creating its own log data. In addition, application developers tend to increase the amount of logged data to get log-based information about as much as possible unexpected operating conditions.

Both tendencies, the increase of different log files and the increase of data contained in those log files, makes a manual analysis of the log data more and more difficult and even impossible.

An approach to improve this situation is the automated analysis of log data that e.g. identifies abnormal logging patterns. One fundamental basis for such automated analysis approaches is the ability to determine and quantify the similarity between different log entries in a fast and memory efficient way.

Current automated analysis systems use well known locality-sensitive algorithms, that produce sets of numeric values or signatures out of typically non-numeric input data like log line. The resulting signatures typically identify their corresponding input data with sufficient accuracy for most applications (neglecting the possibility of hash collisions), and those signatures also describe similarity relationships between input data elements, as similar input data elements also create similar signatures. Therefore, it is sufficient to initially create such a signature for each input element, like e.g. a log-line and then perform all similarity calculations and further higher-level analysis tasks based on those signatures.

As this signature calculation is typically performed for all input elements, and those signatures are the basis for further calculations, it is desired that time and space complexity of those algorithms are minimized, while the accuracy of the created signatures is maximized.

The approaches currently known in the art, most prominent examples are SimHash and MinHash, show deficits in both aspects. Consequently, there is need for an improved method for the calculation of locality-sensitive signatures. Particularly log analytics tasks, and much other tasks in general, that require a fast and accurate determination of the degree of similarity between complex input data would benefit from such an improved mechanism.

This section provides background information related to the present disclosure which is not necessarily prior art.

SUMMARY

This section provides a general summary of the disclosure, and is not a comprehensive disclosure of its full scope or all of its features.

The present disclosure is directed to a method for the calculation of locality-preserving hash signatures that has improved time complexity and accuracy compared to existing methods. The usage of this signature calculation method is shown by example in a log data analysis system.

The calculated hash signatures may be used to form an unbiased estimator of the Jaccard index. The Jaccard index describes the similarity of two sets and is calculated by dividing the number of elements of the intersection of the two sets by the number of elements in the union of the two sets. Typically, hash signatures used to estimate the Jaccard index consist in a list of numeric values, that are generated out of the elements of an input set (e.g. the words in a log line) using a locality-sensitive hashing algorithm (e.g. Min-Hash). A Jaccard index estimate may then e.g. be calculated by relating the number of elements of both signatures that have the same value to the total number of elements in a signature.

Embodiments of the disclosed technology may use a combination of two types of pseudo random numbers as basis for the calculation of the numeric values of a signature.

Instances of the first pseudo random number type are floating-point or real random numbers created in pairwise non-overlapping intervals, where each interval represents one element or slot of the created signature.

Instances of the second pseudo random number type are integer random numbers in the interval from 1 to the number of slots of the signature.

A pseudo random number generator (PRNG) is initialized for each element or feature of the analyzed input set. Each PRNG for a specific feature first creates instances of random numbers of the first type for each slot. Afterwards, the same PRNG creates random numbers of the second type which are used to create a pseudo random permutation of the signature slot. An efficient method to create random permutations, like the Fisher-Yates algorithm may be used to create the permutations. The values of the signature slots are then shuffled according to this permutation.

For each slot index, a separate slot value is calculated based on each feature of the input set and the minimum calculates slot value per slot index is selected as value of the signature at the specific slot index.

Variant embodiments may perform the calculation of the first type random numbers and the calculation of the permutation in an interleaved way, by only calculating the portion of the random permutation that is required for the currently processed slot index. The interleaved calculation improves the runtime complexity of the signature calculation algorithm and only slightly increases its space requirements.

Yet other variant embodiments may specify a relation between the pairwise non-overlapping intervals of the pseudo random number instances of type 1. This relation may define that the boundaries of the pairwise non-overlapping intervals increase with an increased slot index. As an example, the pairwise non-overlapping interval for slot 1 may range from 1 inclusive to 2 exclusive, for slot 2 the interval may range from 2 inclusive to 3 exclusive, etc. Consequently, the created random number instances of type 1 are also ordered and are only increasing. The variant embodiments may further monitor the overall maximum signature value assigned to any slot index for any feature, e.g. by maintaining a histogram of the signature values. The knowledge of the overall maximum signature value, the fact that created random numbers are only increasing and that only the minimum signature values are relevant for the final signature may be used to terminate the calculation early, e.g. when the next created random number can only be larger than the overall maximum.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 contains a block diagram of a log analysis system using based on locality sensitive hash signatures.

FIG. 2 visually describes the calculation of MinHash based signatures.

FIG. 3 visually describes the calculation of SuperMinHash based signatures.

FIGS. 4A-4B provide flow charts of processes to providing pseudo random number generator (PRNG) based on a hashing function.

FIG. 5 shows a block diagram of a signature generator for the runtime optimized calculation of SuperMinHash signatures.

FIG. 6 shows a flow chart of the processing of an incoming data element like a log line by the signal generator.

FIG. 7 provides a flow chart of the processing performed by the signature slot value generator to create signature values using a PRNG initialized with a single feature extracted from an incoming data element.

FIG. 8 shows a flow chart of an exemplary application of SuperMinHash signatures, which uses the signatures of two log lines to determine whether the two log lines are similar.

FIG. 9 provides the flow chart of a process that may be used to identify log data clusters and to provide summary data describing the identified clusters.

FIG. 10 shows a flow chart of process that may be used to create feature data out of problem graphs describing observed, causally related abnormal operating conditions reported by a monitoring system, where the created feature data preserves topological information of the graph followed by the creation of a signature based similarity index for those problems FIGS. 11A-11C provide flow charts of processes that describe the association of problem graphs with a corresponding solution to the problem, the identification of known similar problem graphs for a given current problem graph and generation of solution proposals for the given current problem graph based on the solutions associated to identified known similar problem graphs.

FIGS. 12A-12B provide flow charts that conceptually describe the creation of feature data out of transaction trace data consisting in tree data structures that describe the execution individual transactions in terms of method calls performed by the transaction execution. The created feature data preserves information of the tree structure and may be used to create a signature-based similarity index. Exemplary usage of this similarity index is also shown in the provided flow charts.

FIGS. 13A-13C show flow charts that describe the creation of feature data out of visit data consisting in a list of consecutive transaction executions performed by individual users/web browsers. The created feature data preserves information about the sequence of the performed transaction executions and is used to create a signature-based similarity index. The provided flow charts also describe exemplary usages of the created similarity index.

Corresponding reference numerals indicate corresponding parts throughout the several views of the drawings.

DETAILED DESCRIPTION

Example embodiments will now be described more fully with reference to the accompanying drawings.

Algorithms are first presented for calculating hash signatures of data sets which can be directly used for Jaccard similarity estimation. The Jaccard index $$J = \frac{|A \cap B|}{|A \cup B|}$$

is a measure for the similarity of two sets A and B. If one is interested in pairwise similarities of many sets the direct calculation is often computationally too expensive. Therefore, different algorithms have been proposed, which first calculate hash signatures of individual sets. The Jaccard index can then be quickly determined given only the signatures of the corresponding two sets. Each signature contains condensed information about its corresponding set which is relevant for Jaccard index estimation.

The MinHash algorithm was the first approach to calculate signatures suitable for Jaccard index estimation. The signature consists of m values ($h_0, h_1, \ldots, h_{m-1}$) which are defined for a given data set D by $$h_j(D) := \min_{d \in D}(r_j(d)). \tag{1}$$

The functions $r_j$ are independent and uniform hash functions with value range [0,1). The signature size m is a free parameter and allows trading space and computation time for more precise estimates.

The probability that signature values are equal for two different sets A and B corresponds to the Jaccard index $$P(h_j(A) = h_j(B)) = P(h_j(A \cap B) = h_j(A \cup B)) = \frac{|A \cap B|}{|A \cup B|} = J. \tag{2}$$

Here one can use the equivalence $h_j(A)=h_j(B) \Leftrightarrow h_j(A \cap B)=h_j(A \cup B)$. Therefore, $$\hat{J} = \frac{1}{m}\sum_{j=0}^{m-1} I(h_j(A) = h_j(B)) \tag{3}$$

is an unbiased estimator for the Jaccard index. I denotes the indicator function. Since all signature values are independent and identically distributed, the sum of indicators corresponds to a binomial distribution with sample size m and success probability J. Hence, the variance of the estimator is given by $$\text{Var}(\hat{J}) = \frac{J(1-J)}{m}. \quad (4)$$

Algorithm 1 demonstrates the calculation of the MinHash signature for a given input data sequence $d_0, d_1, \ldots, d_{n-1}$ of length n. Since the input data may contain duplicates, we generally have $|D| \leq n$ for the cardinality of the set $D = \{d_0, d_1, \ldots, d_{n-1}\}$.

For simplicity Algorithm 1 and also the algorithms that are presented later are expressed in terms of a pseudo-random number generator. Assuming independent and uniform hash functions $r_j$ the sequence $r_0(d), r_1(d), \ldots$ behaves statistically like the output of an ideal pseudo-random generator with seed d. By chaining the hash values of different hash functions random bit sequences of arbitrary length can be realized. In practice, the next hash function is evaluated, only if all bits of the previous hash value have been consumed.

The runtime complexity of MinHash is $\mathcal{O}(mn)$, because the inner loop is executed mn times. Since m is large for many applications, more efficient algorithms are desirable.

---

Algorithm 1 MinHash algorithm.

---

Input: $(d_0, d_1, \ldots, d_{n-1})$
Output: $(h_0, h_1, \ldots, h_{m-1}) \in [0,1)^m$
 $(h_0, h_1, \ldots, h_{m-1}) \leftarrow (\infty, \infty, \ldots, \infty)$
 for $i \leftarrow 0, 1, \ldots, n-1$ do
  initialize pseudo-random generator with seed $d_i$
  for $j \leftarrow 0, 1, \ldots, m-1$ do
   $r \leftarrow$ uniform random number from [0,1)
   $h_j \leftarrow \min(h_j, r)$
  end for
 end for

---

The first approach that significantly reduced the calculation time was one permutation hashing. The idea is to divide the input set D randomly into m disjoint subsets $D_0, D_1, \ldots, D_{m-1}$. The hash signature is calculated using a single hash function r $$h_j(D) := \min_{d \in D_j}(r(d)).$$

This procedure results in an optimal runtime complexity of $\mathcal{O}(m+n)$. Unfortunately, for small input sets, especially if $|D|<m$, many subsets are empty and corresponding signature values are undefined. Various densification algorithms have been proposed to resolve this problem, which fill undefined positions in the signature by copying defined values in such a way that estimator remains unbiased. However, all densified hash signatures lead to less precise Jaccard index estimates compared to MinHash for small data sets with $|D|\ll m$. In addition, the best densification scheme in terms of precision that is known in the art has a runtime that scales quadratically with signature size m for very small data sets. Another disadvantage is that signatures of different sets cannot be longer merged after densification to construct the signature for the corresponding union set.

Recently, a new algorithm called fast similarity sketching has been presented that achieves a runtime complexity of $\mathcal{O}(n+m \log m)$ for the case that the input does not contain duplicates $(n=|D|)$. It was also shown that the variance of the Jaccard index estimator is significantly improved for small data sets. However, in contrast to MinHash, it cannot be directly used as streaming algorithm, because multiple passes over the input data are needed. Moreover, the computation time is approximately twice that of MinHash for small data sets with $|D|\ll m$.

Another algorithm is presented for the calculation of signatures appropriate for Jaccard index estimation. This proposed algorithm is referred to as SuperMinHash, because it generally supersedes MinHash. It can be shown that the variance of the Jaccard index estimator is strictly smaller for same signature sizes. In addition, we will show that the runtime for calculating the signatures is comparable for small data sets while it is significantly better for larger data sets as it follows an $\mathcal{O}(n+m \log^2 m)$ scaling law for $n=|D|$. Furthermore, like MinHash, the proposed algorithm requires only a single pass over the input data, which allows a straightforward application to data streams or big data sets that do not fit into memory as a whole.

The proposed algorithm is based on a hash signature defined by $$h_j(D) := \min_{d \in D}(r_j(d) + \pi_j(d)). \quad (5)$$

Here one can extend (1) by adding elements of a random permutation $$\pi(d) = \begin{pmatrix} 0 & 1 & \ldots & m-1 \\ \pi_0(d) & \pi_1(d) & \ldots & \pi_{m-1}(d) \end{pmatrix}$$

that is generated for each input element d. Since the values $r_j(d_0)+\pi_j(d_0), \ldots, r_j(d_{n-1})+\pi_j(d_{n-1})$, are still mutually independent and uniformly distributed over [0,m), (2) also holds here and the Jaccard index estimator will give unbiased results. However, in contrast to MinHash, the signature values $h_0, h_1, \ldots, h_{m-1}$ are no longer independent. As show below, this is the reason for the improved precision when estimating the Jaccard index for small sets.

The new approach requires the generation of random permutations for each input data element. Fisher-Yates shuffling is the standard algorithm for this purpose. The shuffling algorithm uses uniformly distributed integer numbers. Algorithms for the generation of strict uniform random integers that is efficient regarding random bit consumption are found in the art.

A straightforward implementation of (5) would look like Algorithm 2 below. Obviously, the runtime complexity is still $\mathcal{O}(nm)$. However, in the following a couple of algorithmic optimizations are described which finally end up in the proposed SuperMinHash algorithm.

---

Algorithm 2 Straightforward calculation of the new signature defined by (5) using Fisher-Yates shuffling.

---

Input: $(d_0, d_1, \ldots, d_{n-1})$
Output: $(h_0, h_1, \ldots, h_{m-1}) \in [0,m)^m$ -continued Algorithm 2 Straightforward calculation of the new signature
defined by (5) using Fisher-Yates shuffling.

$(h_0, h_1, \ldots, h_{m-1}) \leftarrow (\infty, \infty, \ldots, \infty)$
for $i \leftarrow 0, 1, \ldots, n - 1$ do
    initialize pseudo-random generator with seed $d_i$
    $(p_0, p_1, \ldots, p_{m-1}) \leftarrow (0, 1, \ldots, m - 1)$
    for $j \leftarrow 0, 1, \ldots, m - 1$ do
        $k \leftarrow$ uniform random number from $\{j, \ldots, m - 1\}$
        swap $p_j$ and $p_k$
    end for
    for $j \leftarrow 0, 1, \ldots, m - 1$ do
        $r \leftarrow$ uniform random number from $[0,1)$
        $h_j \leftarrow \min(h_j, r + p_j)$
    end for
end for As first step towards a final algorithm, merge both inner loops in Algorithm 2 and eliminate the initialization of array $(p_0, p_1, \ldots, p_{m-1})$ as demonstrated by Algorithm 3. The trick is to introduce a second array $(q_0, q_1, \ldots, q_{m-1})$ which is used to mark corresponding entries in $(p_0, p_1, \ldots, p_{m-1})$ as initialized during the j-th inner loop cycle. $p_k$ is regarded as initialized if and only if $g_k = j$. Otherwise, $p_k$ is set equal to k when accessed first and $g_k$ is simultaneously set equal to j to flag the entry as initialized.

A second modification compared to Algorithm 2 is that the signature value update $h_j \leftarrow \min(h_j, r+p_j)$ has been replaced by $h_{p_j} \leftarrow \min(h_{p_j}, r+j)$. Both variants are statistically equivalent, because it does not make any difference, whether one interprets the randomly generated permutation as $\pi(d)$ or as its inverse $\pi^{-1}(d)$.

Algorithm 3 shows potential for further improvement. One can see that the signature value updates r+j are strictly increasing within the inner loop. Therefore, if one knows the current maximum of all current signature values, one would be able to leave the inner loop early.

Algorithm 3 Transformed version of Algorithm 2.

Input: $(d_0, d_1, \ldots, d_{n-1})$
Output: $(h_0, h_1, \ldots, h_{m-1}) \in [0, m)^m$
$(h_0, h_1, \ldots, h_{m-1}) \leftarrow (\infty, \infty, \ldots, \infty)$
allocate array $(p_0, p_1, \ldots, p_{m-1})$
$(q_0, q_1, \ldots, q_{m-1}) \leftarrow (-1, -1, \ldots, -1)$
for $i \leftarrow 0, 1, \ldots, n - 1$ do
    initialize pseudo-random generator with seed $d_i$
    for $j \leftarrow 0, 1, \ldots, m - 1$ do
        $r \leftarrow$ uniform random number from $[0,1)$
        $k \leftarrow$ uniform random number from $\{j, \ldots, m - 1\}$
        if $q_j \neq i$ then
            $q_j \leftarrow i$
            $p_j \leftarrow j$
        end if
        if $q_k \neq i$ then
            $q_k \leftarrow i$
            $p_k \leftarrow k$
        end if
        swap $p_j$ and $p_k$
        $h_{p_j} \leftarrow \min(h_{p_j}, r + j)$
    end for
end for The solution is to maintain a histogram over the integral parts of the current signature values $$b_k := \begin{cases} \sum_{j=0}^{m-1} I(\lfloor h_j \rfloor = k) & k \in \{0, 1, \ldots, m-2\} \\ \sum_{j=0}^{m-1} I(h_j \geq m-1) & k = m-1 \end{cases}$$

and also to keep track of the maximum non-zero histogram entry $a := \max(\{j | b_j > 0\})$.

Knowing a allows escaping the inner loop as soon as j>a, because further signature value updates are not possible in this case. The result of all these optimizations is an improved SuperMinHash algorithm as shown in Algorithm 4.

Algorithm 4 SuperMinHash algorithm which
is an optimized version of Algorithm 3.

Input: $(d_0, d_1, \ldots, d_{n-1})$
Output: $(h_0, h_1, \ldots, h_{m-1}) \in [0, m)^m$
$(h_0, h_1, \ldots, h_{m-1}) \leftarrow (\infty, \infty, \ldots, \infty)$
allocate array $(p_0, p_1, \ldots, p_{m-1})$
$(q_0, q_1, \ldots, q_{m-1}) \leftarrow (-1, -1, \ldots, -1)$
$(b_0, b_1, \ldots, b_{m-2}, b_{m-1}) \leftarrow (0, 0, \ldots, 0, m)$
$a \leftarrow m - 1$
for $i \leftarrow 0, 1, \ldots, n - 1$ do
    initialize pseudo-random generator with seed $d_i$
    $j \leftarrow 0$
    while $j \leq a$ do
        $r \leftarrow$ uniform random number from $[0,1)$
        $k \leftarrow$ uniform random number from $\{j, \ldots, m - 1\}$
        if $q_j \neq i$ then
            $q_j \leftarrow i$
            $p_j \leftarrow j$
        end if
        if $q_k \neq i$ then
            $q_k \leftarrow i$
            $p_k \leftarrow k$
        end if
        swap $p_j$ and $p_k$
        if $r + j < h_{p_j}$ then
            $j' \leftarrow \min(\lfloor h_{p_j} \rfloor, m - 1)$
            $h_{p_j} \leftarrow r + j$
            if $j < j'$ then
                $b_{j'} \leftarrow b_{j'} - 1$
                $b_j \leftarrow b_j + 1$
                while $b_a = 0$ do
                    $a \leftarrow a - 1$
                end while
            end if
        end if
        $j \leftarrow j + 1$
    end while
end for The variance of estimator (3) for the new signature is $$\text{Var}(\hat{J}) = \frac{J(1 - J)}{m} \alpha(m, u) \tag{6}$$

where $u:|A\cup B|$ is the union cardinality. The function $\alpha(m,u)$ is defined as $$\alpha(m, u) := 1 - \frac{\sum_{l=1}^{m-1} l^u((l+1)^u + (l-1)^u - 2l^u)}{(m-1)^{u-1}m^u(u-1)}. \quad (7)$$

The function is always in the range $[0,1)$, because the term $(l+1)^u+(l-1)^u-2l^u$ is positive for $u>1$. $\alpha(m, u)$ corresponds to the reduction factor of the variance relative to that of MinHash signatures. Observing the function for different values of m, $\alpha(m, u)$ only depends on the union cardinality u and the signature size m and does not depend on the Jaccard index J. Compared to MinHash, the variance is approximately by a factor of two smaller in case $u<m$.

To verify (6), some simulations were conducted to determine the variance of the Jaccard index estimator for two random sets A and B experimentally. Consider the cases $|A\backslash B|=|B\backslash A|=|A\cap B|=2^k$ with $u=3\cdot 2^k$ and the cases $|A\backslash B|/2=|B\backslash A|=|A\cap B|=2^k$ with $u=4\cdot 2^k$ both for $k\in\{0, 1, \ldots, 11\}$. For each case different triples of disjoint sets $S_{A\backslash B}$, $S_{B\backslash A}$, and $S_{B\cap A}$ have been randomly generated with cardinalities $|A\backslash B|$, $|B\backslash A|$, and $|A\cap B|$, respectively. Then the sets A and B are constructed using $A=S_{A\backslash B}\cup S_{A\cap B}$ and $B=S_{B\backslash A}\cup S_{A\cap B}$. After calculating the corresponding hash signatures, their common Jaccard index has been estimated. The estimates of all simulation runs have been used to calculate the variance and also $\alpha(m,u)$ by dividing by the theoretical MinHash variance (4).

For all simulation runs, a 128-bit version of the MurmurHash3 algorithm is used which allows to specify a seed. A predefined sequence of seed values is used to generate an arbitrary number of hash values for a given data element, which are used as bit source for pseudo-random number generation.

To analyze the runtime of Algorithm 4, first consider the case that all inserted elements are distinct ($n=|D|$). The expected runtime is given by the expected total number of inner (while) loop iterations denoted by $T=T(n,m)$ that are needed when inserting n elements. If $t_s$ denotes the average number of element insertions until a becomes smaller than s, one can write $$T(n, m) = n + \sum_{s=1}^{m-1} \min(t_s, n).$$

Since a is smaller than s as soon as each signature value is less than s, $t_s$ can be regarded as the average number of random permutations that are necessary until any value of $\{0, 1, \ldots, s-1\}$ was mapped to each signature index. This corresponds to the coupon collector's problem with collection size m and group drawings of size s, where each drawing gives s distinct coupons. In this case, the complete collection corresponds to the m signature indices. Drawing a group of coupons corresponds to selecting the first s indices after permuting a list with all m of them.

For the classical coupon collector's problem with group size $s=1$, the well known solution is $$t_1 = mH_m.$$

Here $$H_m := \frac{1}{1} + \frac{1}{2} + \ldots + \frac{1}{m}$$

denotes me m-th harmonic number. Unfortunately, there is no simple expression for $\geq 2$. However, it is easy to find an upper bound for $t_s$. Let $\rho_l$ be the probability that l drawings are necessary to complete the coupon collection for the classical case with group size 1. By definition, one has $\sum_{l=1}^\infty \rho_l l = t_1 = mH_m$ with $\sum_{l=1}^\infty \rho_l = 1$. If l drawings are necessary to complete the collection for the case $s=1$, it is obvious that not more than $\lceil l/s \rceil$ drawings will be necessary for the general case with group size s. Therefore, one can find the upper bound $$t_s \leq \sum_{l=1}^\infty \rho_l \left\lceil \frac{l}{s} \right\rceil \leq \sum_{l=1}^\infty \rho_l \frac{l+s-1}{s} = \frac{mH_m + s - 1}{s}.$$

Using this inequality together with $\min(t_s,n) \leq t_s$, one gets $$T(n, m) \leq n + \sum_{s=1}^{m-1} t_s \leq n + (mH_m - 1)H_{m-1} + m - 1 \quad (8)$$

$$= n + O(m\log^2 m) = O(n + m\log^2 m).$$

Here, the relationship $H_m = \mathcal{O}(\log m)$ is used. In any case, the worst case runtime is limited by the maximum number of inner loop iterations, which is equal to nm, if the shortcut introduced in Algorithm 4 never comes into play. Thus, the new algorithm never needs more inner loop cycles than the MinHash algorithm.

To better understand the runtime of Algorithm 4 compared to the MinHash algorithm, one can investigate the average number of inner loop cycles per inserted data element $T(n,m)/n$. For the proposed algorithm, one expects that that this number starts at m and decreases to 1 as $n\to\infty$. In contrast, the MinHash algorithm always needs m inner loop iterations regardless of the input data size n.

Example embodiments set forth below show the application of proposed SuperMinHash signatures for the analysis of data sets, such as log files. Although some qualities of SuperMinHash signatures match perfectly with the requirements of log analysis, like a higher precision for small signature sizes as compared to conventional MinHash signatures, SuperMinHash signatures may be applied in various other fields, including but not limited to image processing, text processing or the determination of the similarity of graph structures.

Referring now to FIG. 1 which conceptually describes log analysis system directed to the identification of similar log lines and the determination of log line clusters (i.e. sets of similar log lines).

A log file analyzer 100 receives and analyzes log files 105. The received log files may e.g. be produced by monitored processes during their execution. Those log files may describe execution conditions of those processes, including the occurrence of unexpected functional conditions, execution errors or unexpected high or low load conditions. Data contained in the log files may be used to analyze the behavior of the monitored processes.

The log file analyzer extracts and stores 120 log lines contained in incoming log files 105 in a log data repository 103 in form of log line entries 114. Typically, a log file 105 contains multiple log lines, each log line typically contains a time stamp indicating the point in time at which the logged event occurred, a severity indicator indicating the severity of the logged event and a log message that textually describes the occurred event. The log data repository 103 contains log line entries 114 for each log line received with a log file 105. The signature generator 101 is notified on new receiver log lines and fetches 121 those new log lines to create log line signatures 107 for them. The log line signatures 107 are linked with their corresponding log line with a log line reference 113. The created log line signatures 107 are stored in a log line signature index 104. Typically, log line signatures 107 are sufficiently compact to enable the system to keep the whole log line signature index 104 in main memory.

The log line signature index may be used to process log line similarity requests, which e.g. request log lines 114 in the log data repository that are similar to a given received log line 127. Such requests may be received by a log line similarity analyzer 102 which first requests a signature for the given log line 122 from the signature generator 101 and then uses the received signature to identify 124 log line signatures 107 indicate similar log line entries 114 in the log line signature index 104. The log line references 113 of identified log line signatures 107 may be used to fetch the corresponding log line entries 114 from the log data repository 103 which may then be returned 128 by the log line similarity analyzer as response for the received request. The request may in addition to the given log file also contain similarity parameters that define a required degree of similarity. FIG. 8 provides a flow chart that describes the similarity determination in more detail.

In addition to log line similarity determination, the log file analyzer 100 may also identify log line clusters that summarize similar log lines. The log file analyzer may maintain a log line cluster index 108 which is updated 125 on new created log signatures.

Log line signatures 107 typically represent a log line by a list of numbers calculated by a locality sensitive hash technique like SuperMinHash. The log line cluster index 108 may group those numbers into segments and create signature segment storages 109 for each segment. As an example, calculated signatures may consist of 100 numbers and the log line cluster index may create 10 segments containing 10 of those numbers (e.g. segment 1 contains number 1 to 10, segment 2 contains numbers 11 to 20 and so on).

Each signature segment storage 109 may contain multiple segment value entries 110, which again contain a value field 111 containing a value for the segment represented by the enclosing signature segment storage 109 and a matching signatures list 112 containing log signatures 107 having the same segment value.

On receipt of a new log line signature 107, the log line cluster index may calculate the values for all segments of the signature and add it to the matching signatures of corresponding segment values. In a simplified example, where signature segments may only consist of one signature value, the segment values for a new received signature may be 987, 876, 765 etc. The log line cluster index may add the signature 107 to the matching signatures list 112 of the segment value entry 110 representing the value 987 of the signature segment storage 109 representing the first segment. The signature may also be added to matching signatures of the segment value entry 110 representing value 876 of the signature segment storage 109 representing the second segment etc.

A log line cluster analyzer 106 may use the log line cluster index 108 to process log line cluster related requests, like e.g. the requests for size of the log line cluster to which a specific given log line belongs 129. Those requests may in addition contain parameters that are used to identify and define a log line cluster. As an example, the cluster identification parameter may define the number of required matching segments.

On receipt of a cluster size request 129, the log line cluster analyzer 106 may first calculate the signature and then, based on the signature, calculate the segment values of the signature of the received given log line. The calculated segment values may further be used to select segment value records 110 with a value 111 matching the corresponding segment value derived from the received log line. The log line signatures 107 contained in the matching signatures lists of the selected segment value records may be used as a set of candidate log line signatures describing the cluster to which the received log line belongs. A subsequent step may further refine and filter this set by a direct comparison of the candidate signatures with the signature of the received log line. As an example, additional segment values may be calculated for the candidate signatures and only signatures may be selected for which the number of segment values matching a segment value derived from the received log line exceeds a certain minimum as e.g. specified in the received cluster identification parameters.

Afterwards, the log line cluster analyzer 106 may create a response for the received request that contains the size of the filtered candidate signature set as size of the cluster to which the received log line belongs.

Besides identifying a log line cluster to which a specific log line belongs, the cluster analyzer 106 may also perform cyclic processes that identify all existing log line clusters. To identify those log line clusters, the cluster analyzer may e.g. start by fetching the first log line signature 107 in the log line signature index 104 and determine the cluster to which this log line belongs. Afterwards, it may fetch the next log line signature that not yet belongs to a cluster and determine the cluster of this log line. This may be repeated until all log line signatures are processed.

A monitoring system may e.g. cyclically request the sizes of the identified log line clusters to create time series data that describes the frequency of log lines per identified log line cluster over time. This time series data may be processed to create baseline frequency data that corresponds to a normal operating condition of a monitored application. Time series data describing the current log line frequencies may then be compared to the baseline frequency data and a substantial deviation of the current log line frequency data from the baseline may be used as an indication for an abnormal operating condition of the monitored application.

Coming now to FIG. 2, which graphically describes the calculation of a MinHash signature (prior art) out of an input data element, like a log line. In a first step, a set of features 200 containing features $d_1$-$d_n$ 201 is extracted from the input data element. In case of a log line, this may be the severity indicator of the log line and the individual words contained in the log message. Afterwards, a set of PRNGs 203 PRNG ($R_1$-$R_n$ 204) is initialized for each feature $d_1$-$d_n$ using the value of the feature as initialization value for the PRNG. The initialization value or seed of a PRNG determines the sequence of pseudo random numbers created by the PRNG. Two PRNGs initialized with the same value create the same sequence of pseudo random numbers. Therefore, those PRNGs are also called deterministic random number generators.

Afterwards, each PRNG is used 205 to create a random number for each signature for each signature slot value, where all created random numbers are from an interval 1207.

The created random numbers form a matrix of random numbers, where each row 208 corresponds to a feature ($d_1$-$d_n$) and each column corresponds to a signature slot value. The minimum value is selected from each column 209 and used as slot value 211 of the created signature 210.

Referring now to FIG. 3 which visually describes the calculation of a SuperMinHash signature. The calculation also starts with the extraction of a set 200 of features 201 and the initialization 202 of a set of PRNGs 203, containing a PRNG for each feature ($R_1$-$R_n$). Afterwards, each PRNG is used 300 to create m random numbers, where m is the number of required signature slots. The random numbers for each signature slot are created from an individual interval, where the intervals are pairwise non-overlapping, equidistant and equal-sized. As an example, the pseudo random numbers for signature slot 1 may be selected from a continuous interval starting from 1 and including 1 ending with 2 and not including 2, the random numbers for signature slot 2 may be selected from the continuous interval 2 including 2 to 3, excluding 3 etc. This creates a matrix 301 of n (number of features) rows 303 and m (number of slots) columns containing random numbers, where the random numbers of each column are selected from a different interval 302.

Afterwards, the PRNGs $R_1$-$R_n$ are used 304 to create random permutation of each row of the initial matrix 301. More specific, RPNG $R_1$ may be used to create a random permutation of row 1, RPNG $R_2$ may be used to create a random permutation of row 2 and so on. The result is a shuffled matrix 305 containing shuffled rows 306 of random numbers, each row 306 of the shuffled matrix 305 representing a feature (i.e. $d_1$-$d_n$) and containing random numbers from individual, pairwise non-overlapping, equidistant and equal-sized intervals. Both the random numbers and the random permutation of a row are created using a RPNG that was initialized with the feature corresponding to the row. The Fisher-Yates algorithm (for details see https://en.wikipedia.org/wiki/Fisher-Yates_shuffle) may be used for the efficient creation of random permutations.

Each column of the shuffled matrix corresponds to a feature slot. The minimum value of each column is selected 307 and this minimum value is used as value for the signature slot 309 of the calculated signature 308.

Coming now to FIG. 4 which conceptually describes processes that may be used to efficiently create pseudo random numbers as required for the calculation of SuperMinHash signatures.

FIG. 4a describes the initialization of a PRNG for a given feature value $d_i$. The process starts with step 400 when a new feature value is received and continues with step 401 which first initializes a hash counter with value 0 and then stores the hash counter and the feature value in an object representing the PRNG. Afterwards, the hash function that should be used by the PRNG is initialized in step 402. Step 402 may e.g. select the type of hash function that should be used by the PRNG. Hash functions that may be used by the PRNG include but are not limited to murmur3 or xxHash. Following step 403 initializes a random bit FIFO (First In-First Out) buffer or queue that may later be used to temporarily store created random bits. Afterward, the process ends with step 404.

FIG. 4b describes the processing of a request for n random bits by a PRNG. The process starts with step 410 when the PRNG receives such a request. Subsequent decision step 411 determines whether the random bit FIFO buffer contains sufficient random bits to fulfill the request. In case the number of available random bits is not sufficient, step 412 is executed which combines the feature value (as stored in step 401) with the hash counter (also initialized and stored in step 401) to create an input value for the hash function. Subsequent step 413 applies the value created by step 412 as input value for the hash function of the PRNG. The result of the evaluation of the hash function are m random bits which are stored in the random bit FIFO buffer. In addition, step 413 increments the hash counter.

Afterwards, step 411 is executed again and checks if the random bit FIFO buffer now contains sufficient random bits to fulfill the request. In case the number of available random bits is still not sufficient, step 413 is executed.

Otherwise, step 414 is executed which selects the requested n random bits from the random bit FIFO buffer. Subsequent step 415 removes the selected bits from the random bit FIFO buffer and step 416 returns the selected random bits to the sender of the request. Typically, reading data from FIFO buffer or queue also removes the read data, which combines steps 414 and 415.

The process then ends with step 416.

Coming now to FIG. 5 which provides a block diagram of a SuperMinHash based signal generator 101 that performs a runtime-optimized calculation of SuperMinHash signatures. A first optimization combines the calculation of hash values for a specific interval (see matrix 302 in FIG. 3) and the calculation of the random permutation (see matrix 305 in FIG. 3) for the processing of a feature into one step that piece by piece calculates portions of the random permutation as they are needed.

A second optimization is based on the facts that the random numbers are created for different, increasing intervals and that random numbers that are greater than the currently greatest random number in the shuffled matrix 305 cannot influence the resulting signature slots. The second optimization may e.g. maintain a histogram of calculated slot value candidates and use this histogram to determine the greatest overall slot value candidate during the calculation process.

The slot value candidates created for individual features follow a strictly increasing pattern, as slot values are selected from non-overlapping intervals with an increasing lower bound. In case the lower boundary of the interval from which the next slot value candidate for the current feature should be selected is greater than the greatest overall slot value candidate, calculation of the next slot value and all further slot values for that feature can be skipped, as they cannot influence any resulting signature slot value.

The signature generator 101 contains a feature extractor 500, which receives 121, 122 incoming log lines entries 114 and extracts a feature set 502 (e.g. severity indicator and words of the log message) from the received log line entries. The feature set 501 may contain n different features. The feature set is forwarded 503 to a feature set processor 504 which iterates over the features in the received feature set and processes them to create a corresponding log line signature 107.

The signal generator 101 also contains a slot value histogram 520 with m bins 521, each bin representing an interval from which a random value is selected as signature slot value candidate, see intervals 302 on FIG. 3. As an example, those intervals may be specified as [i, i+1), where i may be the signature slot index ranging from 1 to m, where m is the number of signature slots and where "[" indicates an inclusive lower interval boundary (including the number specifying the lower interval boundary) and ")" indicates an exclusive upper interval boundary (excluding the number specifying the upper interval boundary). Next to the slot value histogram 520, the signal generator 101 also contains a shuffled slot index array 509 and a slot shuffle state array which are used to maintain data required for the peace-wise and interleaved calculation of the random permutation of signature slot indexes, and a signature slot value calculator 517, which receives individual features from the feature set processor 504 and interacts with slot value histogram 520, shuffled slot index array 509 and slot shuffle state array 511 to create updates 524 for values of signature slots 523 of a signature 522 contained in a log line signature record 107 corresponding to a received 121, 122 log line record 114.

On receiving a new feature set, the feature processor initializes the slot value histogram 520 by setting the values of bin 1 to m−1 to 0 and setting the value of bin m to m. This indicates that at the beginning of the processing of a new feature set, all slot values are in the interval that covers the highest value range, i.e. the interval [m, m+1).

In addition, the slot shuffle state entries 510 of the slot shuffle state array (q) 509 may be set to an invalid feature index value. This invalid feature index value may e.g. be 0 or −1.

Further, a new shuffled slot index array 511 (p) of size m, containing shuffled slot index entries may be allocated, and the slot values 523 of the signature 522 may be set to the highest possible value to indicate not yet initialized slots.

After initialization of slot value histogram 520, shuffled slot index array 509 and slot shuffle state array 511, the feature set processor 504 may sequentially trigger the execution of the processes performed by the signature slot value calculator 517 for each individual feature. The signal slot value calculator uses the shuffled slot index array 509 and the slot shuffle state array 511 to perform the calculation of a random permutation of slot indexes and the calculation of slot update values in an interleaved way.

The signature slot value calculator 517 may update 513 the shuffled slot index array to perform an alternating piecewise calculation of a random slot index permutation and it may further fetch the 514 index of a slot that is an updated candidate from the shuffled slot index array. In addition, the signature slot value calculator 517 may update 515 and fetch 516 feature shuffle data from the slot shuffle state array to coordinate the piecewise permutation calculation with the iterative processing of individual features.

The signature slot value calculator may further, in case it calculated a value for a signature slot 523 that is lower than the current value of the signature slot 523, update 524 the value of the signature slot to the calculated value. A detailed description of the processing performed by the signature slot value calculator 517 can be found in FIG. 7.

Referring now to FIG. 6, which provides a flow chart of the processing performed by the signature generator 101 on the receipt of a new log line. The process starts with step 600 when the signal generator receives a new log line entry 114. Subsequent step 601 extracts the feature set from the log line entry (e.g. words of the log message and log severity indicator). Following step 602 creates log line signature record 107, sets the values of the slots 523 of the signature 522 to the maximum value to indicate not initialized slots, and sets the log line reference 113 to refer to the received log line entry 114. Afterwards step 603 initializes the slot value histogram 520 by setting the counts of bin 1 to bin m−1 to 0 and the value of bin m to m, to represent the current state of the signature slots 523 (all slot value at highest value). Step 603 may further set a global highest slot index value to m, indicating that the highest slot value is in the highest slot value interval 302 [m, m+1) or higher. The global highest slot index value may further be maintained by the signal slot value calculator 517 during the calculation and update of signature slot values and may be used to determine when further slot value calculations for a feature can be skipped because they can only produce values that are higher than the global highest slot index value. Only values that are lower than the global highest slot index value can potentially change the value of a signature slot 523.

Following step 604 allocates a new shuffled slot index array 509. The shuffled slot index array may be an array of size m (number of signature slots), containing integer elements that can at least hold the maximum index number m.

Step 605 afterwards initializes the slot shuffle state array 511 by setting the m feature index entries 512 (integer elements capable to hold the maximum index number m) to an invalid feature index like 0 or −1.

Following decision step 606 determines if a next feature is available for processing. In case no next feature is available, the process ends with step 610. Otherwise step 607 is executed which fetches the next feature, which is followed by step 608 which initializes a PRNG for the fetched feature as described in FIG. 4*a*. Afterwards, step 608 is executed, which forwards the initialized PRNG and the feature index to the signature slot value calculator. A detailed description of the processing performed by the signature slot value calculator 517 can be found in FIG. 7.

Coming now to FIG. 7 which contains a flow chart that conceptually describes the processing performed by the signature slot value calculator 517 on the receipt of an initialized PRNG and a feature index.

The process starts with step 700 when the signature slot value calculator 517 receives an initialized PRNG and a current feature index. Following step 701 sets the current slot index to 1 to start processing the first slot. Following decision step 702 checks whether the current slot index is greater than the global highest slot index, and in case the current slot index is greater, terminates the process with step 720. In case the current slot index is not greater than the global highest slot index, the process continues with step 703 which fetches a floating-point pseudo random number in the interval [0, 1) from the PRNG as slot value contribution and continues with step 704 which fetches an integer random number from the PRNG out of the value range from current slot index (inclusive) to number of slots m (also inclusive) as slot index permutation contribution. Both random numbers may be created using random bit sequences provided by the PRNG as described in FIG. 4*b*.

Following decision step 705 checks whether the value of the slot shuffle state array at the position of the current slot index is unequal to the current feature index. In case the values are equal, the process continues with step 708.

Otherwise, step 706 is executed which sets the value of the feature index 512 of the slot shuffle state array 511 at the position of the current slot index to the current feature index, followed by step 707 which sets the shuffled slot index 510 of the shuffled slot index array 509 at the position of the current slot index to the current slot index.

Afterwards, decision step 708 is executed which checks whether the value of the slot shuffle state array at position of the index permutation contribution is unequal to the current feature index. In case the values are equal, the process continues with step 711.

Otherwise, 709 is executed which sets the value of the feature index 512 of the slot shuffle state array 511 at the position of the slot index permutation contribution to the current feature index, followed by step 710 which sets the shuffled slot index 510 of the shuffled slot index array 509 at the position of the slot index permutation contribution to the current slot index.

Following step 711 swaps the shuffled slot index entries 510 of the shuffled slot index array 509 at positions current slot index and slot index permutation contribution to perform the calculation of the next required portion of the random index permutation.

Afterwards, step 712 is executed which fetches the slot update index for the update candidate slot 523 of the currently calculated signature 522. Step 712 fetches the shuffled slot index 519 at the position of the current slot index from the shuffled slot index array 510.

Following step 713 uses the slot update index determined in step 712 to fetch the current value of the signature slot 523 at the position of the slot update index. Afterwards step 713 calculates an update value for the selected slot as the sum of the current index and the slot value contribution (this sum is a random number in the interval [current index, current index+1)).

Afterwards, decision step 714 is executed which checks whether the slot update value calculated by step 713 is smaller than the current value of the selected slot. In case the value is not smaller, the process continues with step 719.

Otherwise, the process continues with step 715, which reconstructs the slot index that was used to create the current value of the of the signature slot that was selected by step 712 for the update. The reconstruction of the slot index permutation contribution may be performed by applying a floor function to the current value of the slot get the next lower integer value. In case the slot was not updated before, its current value is still at the initial maximum value that can be held by the data type of the signature slots 523. In this case, the maximum slot index m is used as reconstructed slot index permutation contribution.

Following step 716 sets the value of the signature slot at the position selected by step 712 to the slot update value calculated in step 713.

Afterwards, decision step 717 check whether the current slot index is smaller than the previous slot index calculated in step 715. In case the current slot index is not smaller, the process continues with step 719.

Otherwise, step 718 is executed which updates the slot value histogram 520 by decrementing the count of the histogram bin 521 at the position of the previous slot index calculated in step 715 and incrementing the count of the histogram bin 521 at the position of the current slot index. This updates the slot value histogram 520 according to the change of the signature slot values performed by step 716.

Afterwards, step 718 determines the global highest slot index by selecting the highest index of a histogram bin 521 of the slot value histogram that has a count greater than 0 and using this highest index as global highest slot index.

Following step 719 increments the current slot index and the process continues with step 702.

Coming now to FIG. 8 which provides a flow chart of a process that perform a signature-based similarity calculation, to demonstrate an exemplary application of SuperMinHash signatures.

The process starts with step 800, when the log line similarity analyzer 102 receives two log line entries 114 for which a determination whether they are similar is requested. Following step 801 fetches the signatures of the received log line entries, e.g. by forwarding the log line entries 114 to the signature generator 101 for the calculation of the corresponding signatures. Afterwards, step 802 is executed which calculates a similarity estimate value for the log line entries based on their signatures. The similarity estimate value may be calculated by determining the number of pairwise equal signature slot values (i.e. the value of a slot at a certain position is equal for both signatures) and dividing the number of all slots (i.e. m) by the number of slots having a pairwise equal value. The result of this division is an estimate for the Jaccard coefficient (see e.g. https://en.wikipedia.org/wiki/Jaccard_index) which is a measure for the similarity of sets.

Following decision step 803 compares the similarity estimate value with a specific threshold. In case the similarity estimate value exceeds the threshold, step 804 is executed which indicates that the two log line entries are similar.

Otherwise, step 805 is executed which indicates that the two log lines are not similar.

After step 804 or 805 the process ends with step 806. Further details regarding the methods set forth herein are found in the attached Appendix.

Coming now to FIG. 9, which describes a process that may be used by some variant embodiments to identify clusters of log lines. The process starts with step 900 when the log data analyzer receives new log data in form of log files containing log lines. Following step 901 extracts the log lines from the received log files and creates corresponding log entries 114, which may be stored in the log data repository.

Following step 902 filters the log message data of the log entries by e.g. remove numeric data or special characters from the log line. The intention of removing such data from the log lines is to remove variable parts of otherwise similar log message. As an example, a log message may report that a specific operation lasted longer than expected and contain a numeric value describing the time the operation lasted. Removing this numeric value increases the similarity of those log entries that also describe very similar events. Step 902 also extracts features from the log entry after the filtering step. The extracted features may contain but are not limited to a severity indicator and the words contained in the log message.

Afterwards, step 903 is executed which calculates the signatures of the received log entries as described before.

Subsequent step 904 calculates the similarity index (e.g. as described in FIG. 8) for all pairs of received log entries and selects those log entries that have a similarity index with all other log entries that is below a certain threshold and that have a different severity indicator and a different length of their corresponding log message as log entries representing a cluster of log entries.

Following step 905 iterates over the remaining log entries that were not identified as cluster representing log line in step 904 and identifies for each remaining log entry the cluster representing log line with the highest similarity index. Step 905 further checks whether the similarity index exceeds a certain threshold and whether severity indicator of both log lines and length of the log message match. In case all matches, the log line is assigned to the cluster.

Following step 906 creates summary data for the identified log data clusters, e.g. in form of the log line representing the cluster and the number of log lines assigned to the cluster.

The process then ends with step 907.

Coming now to FIG. 10 which conceptually describes the creation of a similarity index for problem graphs that is based on SuperMinHash signatures. Problem graphs, which may be generated by modern, integrated monitoring systems, represent sets of causally related abnormal operating conditions that are observed in a monitored system. Other observations describing the monitored systems, like resource sharing or communication patterns, are used to determine causal relationships between detected abnormal operating conditions. A set of causally interconnected abnormal operating conditions may be represented by a problem graph.

The causal relationships between abnormal operating conditions in a problem graph, which are represented by directed edges of the graph, provide information that is highly valuable for the resolution of a situation, as abnormal operating conditions that are caused by other abnormal operating conditions can typically be resolved by resolving the causing abnormal operating condition. Therefore, the causal relationships reported in a problem graph provide information indicating the most important or root cause condition of a set of abnormal operating conditions. Efforts to resolve the situation may be concentrated on those root causes of the reported problem because other, depending abnormal operating conditions may automatically return to normal conditions as soon as their root causes no longer exist.

As a consequence, it is important that information about the causal relationships described by a problem graph is also represented in feature data that is used to generated corresponding similarity signatures.

The process of creating or updating a similarity index that is based on SuperMinHash signatures for a problem graph starts with step 1000, when a new problem graph is received. Subsequent step 1001 extracts feature data representing the graph topology by creating a tuple for each edge of the graph. Each created tuple may contain data identifying the cause event and the effect event connected by an edge. It is noteworthy that problem graphs describe causal relationships between (cause) events that cause the occurrence of another (effect) event. Therefore, all edges of a problem graph are directed, i.e. they also provide data about causal direction. The position of cause and effect event in the created tuple is not relevant, as long as it remains the same for each processed event graph. It may be more intuitive to first note the cause event and then the effect event. It is noteworthy that this mapping of the graph structure to tuples represents a loss free transformation, which means that the whole graph structure can be reconstructed with data from the created tuples.

Following step 1002 may enrich each created tuple with discretized data extracted from the graph edges describing the tuple. As example, each edge may contain a causality probability value which describes the probability of the estimated causality between the two nodes. This continuous probability value may be mapped to discrete values like "high probability", "medium probability" or "low probability". Those discrete causality probability values may then be added to the data describing the tuple. This discretization represents a loss of data but using the original continuous probability values would make the feature data and the created signature data too distinctive.

Subsequent step 1003 processes each node of the received event graph to extract feature data describing the node. The extracted feature data may contain data describing the type of the event, the type of the component (e.g. process, host computing system, service provided by a process) on which the event occurred), and discretized data describing e.g. duration and extend of the event. Examples for discretized data describing the extend or severity of an event indicating the percentage of CPU usage may e.g. contain "critical" for usage values from 80-90% or "severe" from 90-100%. The duration of an event may also be mapped to values like "short term", "medium" or "long term". The monitoring system may also analyze problem graphs to identify root cause events. An indicator determining whether an event is a root cause event or not may also be added to the feature data of the events.

The feature value data extracted from the events may be appended to the tuples created in step 1001 containing those events.

The created feature set is used in subsequent step 1004 to create a SubMinHash signature for the received problem graph. The creation of the SubMinHash signature may be performed as discussed earlier in this document. The created SubMinHash signature may further be used to create or update a similarity index for problem graphs. The created similarity index may be created out of signature entries that may contain but are not limited to the signature value for a specific problem graph and reference data of the problem graph that identifies a location on which the problem graph can be found. Various data structures may be used to structure the index to support fast similarity or cluster queries, as e.g. described in FIG. 1.

Following step 1005 stores the received problem graph in a problem archive and adds a reference pointing to the stored problem graph to the signature entry created in step 1004. The created signature index and all the signature entries it contains are typically small in terms of memory and it may be possible to keep them main in memory for fast access. The problem archive containing the larger original data may be e.g. be stored on a hard disk. The process then ends with step 1006.

Coming now to FIG. 11 which shows flow charts of processes that describe an exemplary usage of a problem graph similarity index to propose resolution measures for ongoing problem situations based on known resolution measures for similar observed problem situations.

FIG. 11*a* describes the processing of problem resolution data. Typically, after detection and reporting of a problem graph, corresponding counter measures to resolve the described problem are applied. Those counter measures may either be applied manually by an operator of the monitoring system and the monitored system, or the monitoring system may also provide mechanisms to change the monitored system to provide a semi-automated resolution mechanism, where an operator specifies counter measures via a user interface of the monitoring system and the monitoring system then automatically applies those counter measures. In both variants, it may be observer if the applied counter measures are successful and, in case selected counter measures are not successful, alternative counter measures may be applied until the problem is resolved. The monitoring system may be notified (either manually or automatically) on a successful resolution of a problem, which starts the problem resolution data processing with step 1100. Step 1101 updates the data of the resolved problem in the problem archive by adding data describing the counter measures that led to a resolution of the problem. The process then ends with step 1102.

The process of identifying resolution proposals for a given, ongoing problem graph using the problem similarity index and the data stored in the problem archive is shown in FIG. 11b. The process starts with step 1110, when a request for resolution proposal containing a problem graph describing a currently ongoing problem situation is received. Following step 1111 calculates the signature for the received event graph, e.g. as described in FIG. 10 and subsequent step 1112 queries the problem similarity index for similar problem signatures. As discussed earlier, the similarity of two SuperMinHash signatures may be determined by comparing the number of elements of the signatures with the number of signature elements that are pairwise identical. The result of this comparison may be expressed as similarity indicator which has a value range from 0 indicating no similarity (no pairwise identical signature elements) to 1 (all elements are pairwise equal) indicating equality. Step 1112 may e.g. fetch those signature entries from the problem similarity index for which the number of deviating signature elements is less than a specific number of for which the calculated similarity indicator is higher than a specific value. Afterwards, step 1112 may fetch the problem graphs and resolution data referred by the selected signature entries from the problem archive.

Subsequent step 1113 may then sort the fetched problem graphs according to their similarity with the received problem graph, by sorting them according to the value of the similarity indicator calculated between the signature of each fetched problem graph and the received problem graph. The sorting may be performed from highest similarity indicator to lowest. Following step 1114 may present the resolution data of the fetched similar problem graphs, where resolution data from problem graphs with a higher similarity to the received problem graph may be presented first. The process then ends with step 1115.

FIG. 11c proposes a process that may be used for a cyclic analysis of the problem similarity index and the problem archive to identify clusters of similar problems that occurred on the monitored environment. The identified clusters may further be analyzed to e.g. identify typical root causes for occurred problems and corresponding resolution measures and to identify representative problem graphs for each identified problem cluster as examples for most frequent types of problems that occur in the monitored environment.

The process starts with step 1120, e.g. when a specific time period since the last problem cluster analysis is elapsed, or when the number of problems that were added to the problem archive since the last problem cluster analysis exceeds a certain threshold. Following step 1121 uses the signature index to identify clusters of similar problem graphs. A problem cluster index that is structured like the log line cluster index 108 presented in FIG. 1 may be used for an efficient identification of problem clusters. Step 1121 produces sets of signature entries, containing a signature and a reference to a problem graph stored in the problem archive for each identified problem cluster.

Following step 1122 may, for sets of signature entries defining a cluster, fetch the problem graphs referred by the signature entries and may determine the most frequent root cause events (describing abnormal operating conditions) of the problems forming the respective cluster. Afterwards, step 1123 may propose counter measures for identified most frequent root cause events. The proposed counter measures may then be presented to the user, where presentation of the counter measures may be performed according to the size of the corresponding problem cluster, starting with the problem cluster containing the highest number of problems.

Following step 1124 may, for each cluster identified in step 1121, identify a representative problem graph. A cluster of problem graphs may conceptually be considered as a cloud of data points in a multi-dimensional space, each data point representing a problem graph. The position of each data point in the multidimensional space is defined by the data describing the problem graph. Intuitively, a representative problem graph for a problem cluster would be the problem graph that is situated in the or nearest to "middle" or in the "center of gravity" of the cluster. Although it is theoretically possible to exactly identify such a representative problem graph, this requires a disproportionately high amount of computing power as it requires an analysis of the original data of each problem graph contained in the cluster.

An alternative approach that requires less computing power is to estimate a representative problem graph using the previously calculated signatures to calculate the medoid signature of the cluster. The medoid of a given data set is defined as the element of the dataset for which the sum of the distances to other elements of the data set is the minimum. The similarity indicator that may be calculated between two signatures may also be interpreted as an inverse measure of the distance between the two signatures, where a high similarity indicator indicates small distance and a low similarity indicator indicates a high distance. To calculate the medoid of a cluster using similarity signatures, a similarity indicator needs to be calculated between all signatures of the cluster and the similarity indicators may converted into distance indicators (e.g. by subtracting the similarity indicator from 1 or calculating the reciprocal of the similarity indicator). Then, for each signature in the cluster, the distance indicators to all other signatures in the cluster may be summed up, and the signature for which the sum of distance indicators has the smallest value may be selected as medoid signature. Although this still represents high computational effort, especially for large clusters, the required computing power is in a reasonable range. After the medoid signature for each cluster is identified, following step 1125 may fetch the problem graphs referred by the identified signatures and provide the representative problem graphs, together with other data describing the clusters, like the size of the clusters or all or a sample of the problem graphs contained in the cluster, for subsequent visualization and analysis. The process then ends with step 1126.

Coming now to FIG. 12, which shows flow charts of processes for the creation of a similarity index for transaction traces and for the exemplary usage of the transaction similarity index to find transaction traces that are similar to a specific received transaction trace. Transaction traces describe the execution of individual transactions on the granularity level of individual method executions, where the transaction execution may span multiple execution threads within a process, and multiple processes that may be executed on the same or on different host computing systems. Agents may be deployed on processes involved in the execution of transactions. The agents may monitor transaction executions and provide monitoring data describing process local portions of the monitored transactions together with correlation data that may be used by an external receiver of the monitoring data to combine transaction monitoring data describing different portions of the same transaction that were received from different agents, into end-to-end transaction trace data describing the whole transaction.

FIG. 12a describes the creation or update of a transaction similarity index. The process starts with step 1200 when a new transaction trace is received. Following step 1201 maps the structure of the transaction trace which describes caller/callee relationships of method calls performed by the monitored transaction into feature data for the signature calculation. As already described for problem graphs, tuples may be created for each recorded method call, where one element of the tuple identifies the calling or caller method call and the second element of the tuple identifies the called or callee method. This represents a lossless transformation of the call structure information contained in the transaction trace into feature data.

Subsequent step 1202 may extract additional feature data from each reported method call, where the feature data may be selected form reported data that described the reported method call but does not identify it. Examples for extracted feature data include the name of the executed method, the types of method parameters and method return value, the type of the method call, e.g. thread internal call, call spawning other and transferring execution to other thread, process internal or external call, call involving network communication, type of used network communication etc. or the values of method call parameters or return values that have a small number of discrete values, like Boolean parameters or enumeration parameters (an enumeration type defines a limited set of distinct options). Other parameter and return values may be discretized and the discretized values may be used as feature values describing the method calls. Also, data describing the performance of individual method calls, like the method call duration may be discretized and the discretized value may be used as feature value. The extracted feature values for the individual method calls may be added to the corresponding tuples created in step 1201.

Step 1203 may use the tuple set created in step 1201 as input for the creation of SuperMinHash signatures as described earlier in this document. The created signatures may be used to create similarity index entries containing the created signature and a reference to the transaction trace that was used to create the signature. In subsequent step 1204, the similarity entries may be stored in a similarity index, which may be small enough to keep it in main memory and the corresponding transaction traces may be stored in a transaction repository on a hard disk. The transaction reference of a similarity index entry may point to the storage position of its corresponding transaction trace in the transaction repository. The process then ends with step 1205.

The process shown in FIG. 12b describes the processing of a request for similar transaction traces for a given transaction trace contained in the received request. The process starts with step 1210 when such a request is received. Subsequent step 1211 extracts feature data from the received transaction trace and creates a SuperMinHash signature from the extracted feature data as described in FIG. 12a. Following step 1212 queries the transaction similarity index that was created by the process described in FIG. 12a for similarity index entries with signatures that have a deviation to the signature created in step 1211 that is below a certain threshold. As an example, step 1212 may fetch those similarity index entries for which the number of signature elements that are not pairwise equal is below a certain threshold. This threshold may either have a fixed value or it may be received as parameter of the request for similar transactions.

Following step 1213 fetches the transaction traces associated with the similarity entries identified in step 1212 from the transaction repository.

Step 1214 may apply other filter that are contained in the received request, like filters restricting the desired similar transactions to a specific execution time frame, a specific geolocation or a specific transaction error condition. Step 1214 may apply those filters to the transaction traces fetched by step 1213 and reject those transactions that do not match the provided filters.

Following step 1215 may provide the filtered similar transactions for subsequent visualization and analysis. The process then ends with step 1216.

Coming now to FIG. 13 which provides flow charts to create and use a similarity index for visit data. Visit data may be defined as a sequence of transaction traces that was executed from a single web browser and most probably also by a single user of the application, for which the delay between two consecutive transaction executions is below a certain threshold. A visit describes how an individual user interacts with the monitored application. Based on an individual visit, this allows an operator of the monitoring system and the monitored system whether the user used the application as intended by the operator. To extend those kinds of analyses to the whole set of visits or users or at least to a majority of them, fast similarity queries or similarity cluster identifications are inevitable.

FIG. 13a describes a process that incrementally creates a similarity index for visit data. The process starts with step 1300, when a new visit data record is received. Following step 1301 creates feature data for the received visits that preserves the transaction sequence described by the visit. As discussed earlier for problem graphs and transaction traces, this may be performed by creating tuples of directly connected elements. For the visit data case, those tuples may contain data describing two consecutive transactions of the visit. Step 1301 may create such tuples for each pair of consecutive transactions in the visit and extract data describing the web browser side monitoring data describing the user interaction that triggered those transaction executions. This data may include a name and type of the user interaction element used to trigger the transaction data describing the web page containing the user interaction element (monitoring systems may deploy agents also to web browser operated by users to interact with the monitored application. Those web browser side agents may instrument documents and scripts sent to the web browser for interaction with the monitored application. Those instrumentations may report monitoring data describing interactions of the user with those documents and scripts. This monitoring data may also contain name and type of user interaction elements with which the user interacted together with correlation data allowing to identify transaction traces of server-side transactions caused by those interactions), together with data describing a request sent from the web browser to a web server of the monitored system to process the server side portion of the transaction. Some portions of the request data that uniquely identify the request may not be used as feature data, those portions may include time stamp data, or the values of parameters sent with the request. Request data that may be used as feature data for the signature creation includes data identifying the requested document or function execution, data describing the type of parameters contained in the request (a request may e.g. contain a parameter type or key "product identifier" with a parameter value identifying a specific product. The parameter type or key may be used as input for the signature calculation, the parameter value may not be used as it may be considered too specific for the individual request).

After step 1301 created the tuple set describing the request sequence of the visit, step 1302 is executed which creates feature data for each transaction trace contained in the visit. Creation of feature data from individual transaction traces may be performed as described in FIG. 12a. The feature data extracted from the transaction traces may be appended to the corresponding request data entries of the tuples created in step 1301.

Some embodiments may omit step 1302 and only use browser side monitoring data as input for the similarity signature calculation.

Following step 1303 uses the feature data created by the previous steps to create a SuperMinHash signature as explained earlier. A visit similarity index entry, containing the created signature and a reference to the corresponding visit is created and added to the visit similarity index.

Step 1304 afterwards stores the visit in a visit repository. As the visit similarity index only contains signature and reference data, its memory footprint is small enough to allow a storage in main memory. The visit repository, containing all visit data may be stored on a hard disk. The process then ends with step 1305.

Coming now to FIG. 13b, which describes the process of identifying visits that are similar to a given received visit. The process starts with step 1310 when a request for visits that are similar to a visit contained in the request is received. Following step 1311 extracts feature data from the received visit and uses the extracted feature data to calculate a SuperMinHash signature for the received visit. The feature extraction may be performed as described FIG. 13a. Afterwards, step 1312 is executed, which queries the visit similarity index for visit similarity index entries with a signature that has a deviation from the signature created in step 1311 that is below a certain threshold. This threshold may e.g. be defined as the maximum number of not pairwise equal signature elements. The value of the threshold may either be fixed or it may be received as additional parameter of the received visit similarity request.

Subsequent step 1313 may fetch the visits referred by the visit similarity index entries identified by step 1313 from the visit repository.

Following step 1314 may apply additional filters that may also be received with the visit similarity request on the visit records fetched by step 1313. Those filters may contain timing filters that select visits according to the time of their execution or according to their duration, web browser type or operating system type specific filters which filter visits based on the web browser operating system that was used to execute those visits or other filters like filters based on the number of transaction traces or user interactions contained in a visit.

Subsequent step 1315 provides the filtered set of similar visits for subsequent visualization and analysis. The process then ends with step 1316.

Referring now to FIG. 13c which describes a process to determine the typical or representative visits for a monitored application. Goal of this process is to provide compact information about how typical user interactions with the monitored application look like. Such information may be important for an operator of a monitored application to identify deviations from a desired type of interaction.

The process starts with step 1320 when a request for typical visits is received. Following step 1321 uses the visit similarity index to identify clusters of similar visits. Cluster identification may e.g. be performed by using a variant cluster index for visits, similar to the log line cluster index discussed in FIG. 1. The identified clusters may afterwards be filtered by e.g. only selecting the largest n clusters or by selecting only those clusters that contain more visits than a specific percentage of all visits.

Step 1322 afterwards analyzes each cluster provided by step 1321 to identify a representative visit for the cluster, e.g. by using the similarity signatures of the visits in a cluster to estimate the medoid visit of each cluster and use this medoid visit as representative or typical visit for the cluster. Some variant may calculate multiple candidates for representative visits by e.g. first estimating the medoid visit for all visits in a cluster and then calculating a subsequent medoid based on all visits of the cluster, except the previously identified medoid visit. This approach allows the calculation of an arbitrary number of typical visits for each cluster.

Following step 1323 provides the identified representing visits, together with meta data describing the corresponding visits like e.g. the size of the cluster for subsequent visualization and analysis. The process then ends with step 1324.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for identifying problem resolutions in a computing environment, comprising: receiving a problem graph for a current problem in the computing environment, wherein the problem graph describes abnormal operating conditions in the computing environment; generating a signature of interest from the problem graph; comparing the signature of interest to a plurality of signatures stored in an index, where each signature in the plurality of signatures is derived from a previous problem graph and has an associated problem resolution, such that the previous problem graph represents an occurrence of a previous problem in the computing environment; and identifying one or more previous problems that are similar to the current problem based on the comparison of the signature of interest to the plurality of signatures, wherein the signature of interest is generated by extracting a group of data features from the problem graph, where the group of data features preserves the connection structure of the graph; for each extracted data feature in the group of data features, generating a list of random numbers using a pseudo random number generator, where the random numbers in each of the lists of random numbers are generated from different non-overlapping intervals; for each list of random numbers, creating a random permutation of the list of random numbers; grouping the random numbers from the lists of random numbers into subsets of random numbers, where the random numbers having same placement in the lists of random numbers are grouped into the same subset of random numbers; from each subset of random numbers, selecting a particular random number from a subset of random numbers, where the particular random number has the smallest value amongst the random numbers in the subset of random numbers; and concatenating the selected random numbers to form the signature of interest from the problem graph.

2. The method of claim 1 wherein nodes comprising the problem graph represent events in the computing environment and edges in the problem graph represent a causal relationship between events in the problem graph.

3. The method of claim 2 wherein extracting a group of data features from the problem graph further comprises creating a tuple for each edge in the problem graph, such that a given tuple includes data identifying nodes connected by a given edge.

4. The method of claim 3 wherein extracting a group of data features from the problem graph further comprises identifying a causality probability associated with each edge in the problem graph, mapping the causality probability to one of a set of discrete values for the causality probability and adding the mapped discrete vale to the tuple for the given edge.

5. The method of claim 1 wherein identifying one or more previous problems that are similar to the current problem further comprises comparing each number in the signature of interest to corresponding number in a given signature from the plurality of signatures and totaling how many numbers are identical between the signature of interest and the given signature.

6. The method of claim 1 wherein generating a list of random numbers includes applying a hash function to at least a portion of the extracted data feature.

7. The method of claim 1 further comprises initializing a pseudo random number generator for each of the extracted data features in the group of data features.

8. The method of claim 7 further comprises initializing the pseudo random number generator using a value of the extracted data feature.

9. The method of claim 1 further comprises creating a random permutation of the row using Fisher-Yates shuffle method.

10. The method of claim 1 further comprises combining the step of generating a list of random numbers and creating a random permutation into one iterative step.

11. The method of claim 1 further comprises for each extracted data feature in the group of data features, arranging non-overlapping intervals with values defining the non-overlapping intervals in ascending order; tracking value of a random number having highest value amongst the generated random numbers generated for the lists of random numbers; and for a given extracted feature, ceasing to generate a list of random numbers when a lower bound of the corresponding non-overlapping interval for the given extracted feature exceeds the tracked value.

12. The non-transitory computer-readable medium of claim 11 wherein identifying one or more previous problems that are similar to the current problem further comprises comparing each number in the signature of interest to corresponding number in a given signature from the plurality of signatures and totaling how many numbers are identical between the signature of interest and the given signature.

13. The non-transitory computer-readable medium of claim 11 wherein generating a list of random numbers includes applying a hash function to at least a portion of the extracted data feature.

14. The non-transitory computer-readable medium of claim 11 further comprises initializing a pseudo random number generator for each of the extracted data features in the group of data features.

15. The non-transitory computer-readable medium of claim 14 further comprises initializing the pseudo random number generator using a value of the extracted data feature.

16. The non-transitory computer-readable medium of claim 11 further comprises creating a random permutation of the row using Fisher-Yates shuffle method.

17. The non-transitory computer-readable medium of claim 11 further comprises combining the step of generating a list of random numbers and creating a random permutation into one iterative step.

18. The non-transitory computer-readable medium of claim 11 further comprises
- for each extracted data feature in the group of data features, arranging non-overlapping intervals with values defining the non-overlapping intervals in ascending order;
- tracking value of a random number having highest value amongst the generated random numbers generated for the lists of random numbers; and
- for a given extracted feature, ceasing to generate a list of random numbers when a lower bound of the corresponding non-overlapping interval for the given extracted feature exceeds the tracked value.

19. A non-transitory computer-readable medium having computer-executable instructions that, upon execution of the instructions by a processor of a computer, cause the computer to perform:
- receiving a problem graph for a current problem in a computing environment, wherein the problem graph describes abnormal operating conditions in the computing environment;
- generating a signature of interest from the problem graph;
- comparing the signature of interest to a plurality of signatures stored in an index, where each signature in the plurality of signatures is derived from a previous problem graph and has an associated problem resolution, such that the previous problem graph represents an occurrence of a previous problem in the computing environment; and
- identifying one or more previous problems that are similar to the current problem based on the comparison of the signature of interest to the plurality of signatures, wherein the signature of interest is generated by
  - extracting a group of data features from the problem graph, where the group of data features preserves the connection structure of the graph;
  - for each extracted data feature in the group of data features, generating a list of random numbers using a pseudo random number generator, where the random numbers in each of the lists of random numbers are generated from different non-overlapping intervals;
  - for each list of random numbers, creating a random permutation of the list of random numbers;
  - grouping the random numbers from the lists of random numbers into subsets of random numbers, where the random numbers having same placement in the lists of random numbers are grouped into the same subset of random numbers;
  - from each subset of random numbers, selecting a particular random number from a subset of random numbers, where the particular random number has the smallest value amongst the random numbers in the subset of random numbers; and
  - concatenating the selected random numbers to form the signature of interest from the problem graph.

20. The non-transitory computer-readable medium of claim 19 wherein nodes comprising the problem graph represent events in the computing environment and edges in the problem graph represent a causal relationship between events in the problem graph.

21. The non-transitory computer-readable medium of claim 20 wherein extracting a group of data features from the problem graph further comprises creating a tuple for each edge in the problem graph, such that a given tuple includes data identifying nodes connected by a given edge.

22. The non-transitory computer-readable medium of claim 21 wherein extracting a group of data features from the problem graph further comprises identifying a causality probability associated with each edge in the problem graph, mapping the causality probability to one of a set of discrete values for the causality probability and adding the mapped discrete vale to the tuple for the given edge.

* * * * *